US012558818B2

(12) United States Patent
Goldberg et al.

(10) Patent No.: US 12,558,818 B2
(45) Date of Patent: Feb. 24, 2026

(54) POROUS MOLD FOR MOLDED FIBER PART MANUFACTURING AND METHOD FOR ADDITIVE MANUFACTURING OF SAME

(71) Applicant: Congruens Group, LLC, San Carlos, CA (US)

(72) Inventors: Joshua Gouled Goldberg, San Carlos, CA (US); George David Suarez, San Carlos, CA (US); Paul Leeman, San Carlos, CA (US); Daniel Noah Paley, San Carlos, CA (US)

(73) Assignee: Congruens Group, LLC, San Carlos, CA (US)

( * ) Notice: Subject to any disclaimer, the term of this patent is extended or adjusted under 35 U.S.C. 154(b) by 273 days.

(21) Appl. No.: 18/245,175

(22) PCT Filed: Sep. 29, 2021

(86) PCT No.: PCT/US2021/052731
§ 371 (c)(1),
(2) Date: Mar. 14, 2023

(87) PCT Pub. No.: WO2022/072555
PCT Pub. Date: Apr. 7, 2022

(65) Prior Publication Data

US 2023/0364831 A1    Nov. 16, 2023

Related U.S. Application Data

(60) Provisional application No. 63/084,736, filed on Sep. 29, 2020.

(51) Int. Cl.
*D21J 3/00*     (2006.01)
*B29C 33/38*     (2006.01)
(Continued)

(52) U.S. Cl.
CPC ...... *B29C 33/3814* (2013.01); *B29C 33/3842* (2013.01); *B33Y 80/00* (2014.12); *D21J 3/00* (2013.01); *B29C 64/118* (2017.08)

(58) Field of Classification Search
CPC .............................. B29C 33/3814; D21J 3/00
See application file for complete search history.

(56) References Cited

U.S. PATENT DOCUMENTS

| | | |
|---|---|---|
| 132,808 A | 11/1872 | Currier |
| 1,236,360 A | 8/1917 | Rice |

(Continued)

FOREIGN PATENT DOCUMENTS

| | | |
|---|---|---|
| AU | 1977025870 | 6/1976 |
| AU | 2018211256 | 8/2018 |

(Continued)

OTHER PUBLICATIONS

Casper W. Chang et al., "Container for Transport and Storage of Food Products," U.S. Appl. No. 62/311,787, filed Mar. 22, 2016, 50 pages.

(Continued)

*Primary Examiner* — Timothy Kennedy
(74) *Attorney, Agent, or Firm* — Goodwin Procter LLP

(57) ABSTRACT

This disclosure describes systems and methods for creating porous molds using additive manufacturing processes such as three-dimensional (3D) printing. At a high level, it has been found that creating a generally porous mold, or a mold with porous regions or zones, can improve the performance of the mold and the quality of the parts created therefrom. It has further been determined that porous molds can be created using additive manufacturing techniques through manipulation of mold manufacturing parameters such as, but not limited to, layer thickness, number of perimeter layers, fill pattern, and fill density. Through variation of these (Continued)

manufacturing parameters, the porosity of a mold created by an additive manufacturing device, e.g., a 3D printer, can be tailored for use with molded fiber.

19 Claims, 22 Drawing Sheets

(51) Int. Cl.
B33Y 80/00 (2015.01)
B29C 64/118 (2017.01)

(56) References Cited

U.S. PATENT DOCUMENTS

| | | | |
|---|---|---|---|
| 1,587,288 A | 6/1926 | Dooly | |
| 1,718,668 A | 6/1929 | Smythe | |
| D101,166 S | 9/1936 | Forsberg | |
| 2,301,510 A | 11/1942 | Bolen | |
| 3,132,423 A | 5/1964 | DeLano | |
| 3,155,303 A | 11/1964 | Fenkel | |
| 3,268,198 A | 8/1966 | Swett | |
| 3,392,468 A | 7/1968 | Wolf | |
| D213,898 S | 4/1969 | Monaco | |
| 3,442,433 A | 5/1969 | Lombardi | |
| D215,766 S | 10/1969 | Dusek | |
| 3,664,256 A | 5/1972 | Peirce | |
| D223,854 S | 6/1972 | Swett | |
| 3,755,213 A * | 8/1973 | Kendall | B29C 67/205 |
| | | | 521/181 |
| RE28,059 E | 7/1974 | Mounts | |
| 3,929,564 A | 12/1975 | Reifers | |
| 3,954,178 A | 5/1976 | Mason, Jr. | |
| 3,985,991 A | 10/1976 | Levinson | |
| D242,108 S | 11/1976 | Dart | |
| D243,912 S | 4/1977 | Daenen | |
| D244,065 S | 4/1977 | Daenen | |
| D245,384 S | 8/1977 | Ashton | |
| 4,061,241 A | 12/1977 | Retelny | |
| 4,120,398 A | 10/1978 | Braddon | |
| 4,127,189 A | 11/1978 | Shumrack et al. | |
| D252,008 S | 6/1979 | Jeambey | |
| 4,197,940 A | 4/1980 | DeRossett | |
| D260,492 S | 9/1981 | Scott | |
| 4,360,118 A | 11/1982 | Stern | |
| 4,373,633 A | 2/1983 | Lutz, Sr. | |
| 4,373,636 A | 2/1983 | Hoffman | |
| 4,498,586 A | 2/1985 | Vitale | |
| 4,632,836 A | 12/1986 | Abbott et al. | |
| 4,656,068 A | 4/1987 | Raines | |
| D292,887 S | 11/1987 | Schouten | |
| 4,816,646 A | 3/1989 | Solomon et al. | |
| 4,886,179 A | 12/1989 | Volk | |
| D306,118 S | 2/1990 | Guerrero | |
| D307,243 S | 4/1990 | Baker | |
| 4,919,477 A | 4/1990 | Bingham et al. | |
| 5,078,257 A | 1/1992 | Carter, Jr. | |
| 5,101,997 A | 4/1992 | Bagwell et al. | |
| D333,754 S | 3/1993 | Conti | |
| 5,215,775 A | 6/1993 | Hoffman, Jr. | |
| 5,271,518 A | 12/1993 | Webb | |
| 5,273,174 A | 12/1993 | Fisher | |
| D348,219 S | 6/1994 | Goldberg | |
| D350,046 S | 8/1994 | Zimmerman | |
| D353,768 S | 12/1994 | Hayes | |
| 5,377,860 A | 1/1995 | Littlejohn et al. | |
| 5,411,140 A | 5/1995 | Byer | |
| 5,423,477 A | 6/1995 | Valdman et al. | |
| D361,594 S | 8/1995 | Salis | |
| D363,219 S | 10/1995 | Borsboom | |
| 5,472,139 A | 12/1995 | Valdman et al. | |
| 5,518,133 A | 5/1996 | Hayes et al. | |
| D371,276 S | 7/1996 | Laib | |
| D371,511 S | 7/1996 | Giarracca | |
| D373,704 S | 9/1996 | Doxey | |
| D375,261 S | 11/1996 | Fiori | |
| 5,603,808 A * | 2/1997 | Nishikawa | D21J 7/00 |
| | | | 249/141 |
| 5,662,237 A | 9/1997 | Cain | |
| 5,732,610 A | 3/1998 | Halladay et al. | |
| D393,801 S | 4/1998 | Hayes et al. | |
| D394,005 S | 5/1998 | Marijnissen | |
| D395,599 S | 6/1998 | Wyslotsky | |
| 5,772,070 A | 6/1998 | Hayes | |
| D397,611 S | 9/1998 | Robinson | |
| D398,846 S | 9/1998 | Wyslotsky | |
| D398,847 S | 9/1998 | Wyslotsky et al. | |
| D398,848 S | 9/1998 | Wyslotsky | |
| 5,800,875 A * | 9/1998 | Hussong | F24C 3/006 |
| | | | 427/430.1 |
| D400,394 S | 11/1998 | Banach et al. | |
| 5,873,294 A | 2/1999 | Scuito | |
| 5,878,904 A | 3/1999 | Schweigert | |
| D415,652 S | 10/1999 | Loew | |
| 5,997,924 A | 12/1999 | Olander, Jr. et al. | |
| D433,334 S | 11/2000 | Hayes et al. | |
| D438,466 S | 3/2001 | Fletcher et al. | |
| D440,490 S | 4/2001 | Lizzio | |
| 6,210,531 B1 | 4/2001 | Bradford | |
| D445,687 S | 7/2001 | Gilbertson | |
| 6,257,434 B1 | 7/2001 | Lizzio | |
| 6,287,428 B1 | 9/2001 | Gale et al. | |
| D468,206 S | 1/2003 | Weiss | |
| D471,100 S | 3/2003 | Guzowski | |
| D473,791 S | 4/2003 | Loris | |
| 6,568,586 B1 | 5/2003 | Esley et al. | |
| D475,897 S | 6/2003 | Zettle | |
| 6,601,758 B2 | 8/2003 | Lizzio | |
| 6,627,862 B1 | 9/2003 | Pedersen | |
| D482,283 S | 11/2003 | Wichmann et al. | |
| D484,412 S | 12/2003 | Willis | |
| D484,749 S | 1/2004 | Garraway | |
| 6,722,836 B2 | 4/2004 | Jager | |
| D502,050 S | 2/2005 | Munson et al. | |
| 6,858,243 B2 | 2/2005 | Blanchet et al. | |
| D504,053 S | 4/2005 | Bertulis | |
| D505,596 S | 5/2005 | Tucker | |
| 6,886,704 B2 | 5/2005 | Hayes | |
| D507,078 S | 7/2005 | Greenfiled | |
| D508,378 S | 8/2005 | Bertulis | |
| 6,957,111 B2 | 10/2005 | Zhu et al. | |
| D511,096 S | 11/2005 | Demaggio | |
| D524,662 S | 7/2006 | Fager | |
| D532,689 S | 11/2006 | Rotta | |
| D535,143 S | 1/2007 | Kortleven | |
| D546,128 S | 7/2007 | Carlson | |
| D547,602 S | 7/2007 | Yamasaki | |
| D549,050 S | 8/2007 | Spencer et al. | |
| D556,567 S | 12/2007 | Templeton | |
| D562,135 S | 2/2008 | Studee | |
| D563,785 S | 3/2008 | Maki et al. | |
| D573,466 S | 7/2008 | White et al. | |
| 7,505,929 B2 | 3/2009 | Angert et al. | |
| D598,714 S | 8/2009 | Aagaard | |
| 7,678,036 B1 | 3/2010 | Malitas et al. | |
| D618,562 S | 6/2010 | Bizzell | |
| D620,765 S | 8/2010 | Sudia | |
| D620,766 S | 8/2010 | Sudia | |
| D621,650 S | 8/2010 | DeLeo | |
| 7,778,773 B2 | 8/2010 | Yaqub et al. | |
| D628,485 S | 12/2010 | Golota | |
| 7,884,306 B2 | 2/2011 | Leach | |
| 7,900,793 B2 | 3/2011 | Hanson et al. | |
| 7,942,268 B2 | 5/2011 | Manca | |
| D641,233 S | 7/2011 | Pugh | |
| 7,984,667 B2 | 7/2011 | Freudinger | |
| D645,711 S | 9/2011 | Sudia | |
| 8,033,420 B2 | 10/2011 | Roseblade | |
| D653,906 S | 2/2012 | Bull | |
| D653,907 S | 2/2012 | Backaert et al. | |
| D670,162 S | 11/2012 | Segal | |
| 8,343,560 B2 | 1/2013 | Blythe et al. | |
| 8,430,262 B2 | 4/2013 | Corbett et al. | |
| D684,046 S | 6/2013 | Meyer | |
| D684,462 S | 6/2013 | Hite | |

(56) References Cited

U.S. PATENT DOCUMENTS

| | | | |
|---|---|---|---|
| 8,549,432 | B2 | 10/2013 | Warner |
| 8,561,823 | B1 | 10/2013 | Krupa |
| 8,567,604 | B2 | 10/2013 | Overgaad |
| D696,066 | S | 12/2013 | Parikh |
| D699,106 | S | 2/2014 | Glaser |
| D701,567 | S | 3/2014 | Abdullah |
| 8,663,419 | B2 | 3/2014 | Corbett et al. |
| D702,510 | S | 4/2014 | Segal |
| 8,807,377 | B2 | 8/2014 | Corbett et al. |
| 8,858,858 | B2 | 10/2014 | Middleton et al. |
| D720,227 | S | 12/2014 | Corbett et al. |
| 8,991,635 | B2 | 3/2015 | Myerscough |
| 9,005,348 | B2 | 4/2015 | Ott |
| 9,010,621 | B2 | 4/2015 | Baker et al. |
| 9,073,666 | B2 | 7/2015 | Petlak et al. |
| 9,114,916 | B2 | 8/2015 | Knipe |
| 9,126,717 | B2 | 9/2015 | Myerscough |
| 9,126,719 | B2 | 9/2015 | Corbett et al. |
| D743,838 | S | 11/2015 | Gillingham |
| D747,221 | S | 1/2016 | Changpan |
| D748,329 | S | 1/2016 | Bagai et al. |
| D749,906 | S | 2/2016 | Lee |
| D751,381 | S | 3/2016 | Torrison et al. |
| 9,292,889 | B2 | 3/2016 | Garden |
| D755,577 | S | 5/2016 | Segal |
| D761,103 | S | 7/2016 | Lebon |
| 9,387,786 | B2 | 7/2016 | Weiner et al. |
| 9,446,889 | B2 | 9/2016 | Lopes et al. |
| D768,843 | S | 10/2016 | Honeyball |
| D769,051 | S | 10/2016 | Lee |
| D769,052 | S | 10/2016 | Lee |
| D769,057 | S | 10/2016 | Lee |
| D769,058 | S | 10/2016 | Lee |
| 9,504,340 | B2 | 11/2016 | Starr |
| D774,900 | S | 12/2016 | Longoni et al. |
| 9,522,761 | B2 | 12/2016 | Baker et al. |
| D775,500 | S | 1/2017 | Hogeback |
| D792,962 | S | 7/2017 | Honeyball |
| D795,069 | S | 8/2017 | Haddad |
| D795,070 | S | 8/2017 | Haddad |
| 9,730,555 | B1 | 8/2017 | Lee |
| D801,176 | S | 10/2017 | Lynd et al. |
| 9,783,928 | B2 | 10/2017 | Zheng et al. |
| 9,815,191 | B2 | 11/2017 | Oleynik |
| D804,322 | S | 12/2017 | Fox et al. |
| D804,962 | S | 12/2017 | Fox et al. |
| D806,575 | S | 1/2018 | Collins et al. |
| D811,214 | S | 2/2018 | Wu |
| D817,701 | S | 5/2018 | Ho |
| D821,807 | S | 7/2018 | Yap |
| D827,452 | S | 9/2018 | Collins et al. |
| D828,161 | S | 9/2018 | Collins et al. |
| D829,512 | S | 10/2018 | Masanek, Jr. |
| D833,204 | S | 11/2018 | Lee |
| D835,455 | S | 12/2018 | Sedgwick |
| 10,213,048 | B2 | 2/2019 | Lee |
| D843,207 | S | 3/2019 | Das et al. |
| D854,381 | S | 7/2019 | Yang |
| D856,799 | S | 8/2019 | Dominion |
| D857,492 | S | 8/2019 | Dominion |
| D859,936 | S | 9/2019 | Buck |
| D861,422 | S | 10/2019 | Collins |
| D866,249 | S | 11/2019 | Chiang |
| D870,963 | S | 12/2019 | White et al. |
| D871,834 | S | 1/2020 | Sarnoff et al. |
| D872,599 | S | 1/2020 | Krueger |
| D883,780 | S | 5/2020 | Wu |
| D884,486 | S | 5/2020 | Chiang |
| 10,654,640 | B2 | 5/2020 | Chiang |
| D886,592 | S | 6/2020 | Dominion |
| D889,902 | S | 7/2020 | Cheng |
| D889,903 | S | 7/2020 | Cheng |
| D892,540 | S | 8/2020 | Collins |
| D892,633 | S | 8/2020 | Chiang |
| D893,247 | S | 8/2020 | Chiang |
| 10,737,867 | B2 | 8/2020 | Chiang |
| D900,558 | S | 11/2020 | Chiang |
| D918,712 | S | 5/2021 | Bontrager |
| D930,476 | S | 9/2021 | Bontrager et al. |
| D962,059 | S | 8/2022 | Chiang |
| 11,738,485 | B2 | 8/2023 | Gonzalez et al. |
| 2001/0035275 | A1* | 11/2001 | Gale ..................... B33Y 70/00 |
| | | | 162/382 |
| 2002/0040862 | A1 | 4/2002 | Lizzio |
| 2002/0048624 | A1 | 4/2002 | Blanchet et al. |
| 2002/0148845 | A1 | 10/2002 | Zettle et al. |
| 2003/0037681 | A1 | 2/2003 | Zhu et al. |
| 2003/0160365 | A1 | 8/2003 | Brown |
| 2005/0109653 | A1 | 5/2005 | Wnek et al. |
| 2005/0150624 | A1 | 7/2005 | Toh et al. |
| 2005/0153013 | A1 | 7/2005 | Lee |
| 2005/0189350 | A1 | 9/2005 | Hayes et al. |
| 2005/0193901 | A1 | 9/2005 | Buehler |
| 2006/0175223 | A1 | 8/2006 | Casanovas |
| 2006/0213916 | A1 | 9/2006 | Brown et al. |
| 2006/0226669 | A1 | 10/2006 | Tong et al. |
| 2007/0042075 | A1 | 2/2007 | Cavallaro |
| 2007/0241110 | A1 | 10/2007 | Belleggia |
| 2007/0295631 | A1 | 12/2007 | Lin |
| 2008/0023459 | A1 | 1/2008 | Leach |
| 2008/0128313 | A1 | 6/2008 | Anderson |
| 2008/0275643 | A1 | 11/2008 | Yaqub et al. |
| 2009/0048890 | A1 | 2/2009 | Burgh |
| 2009/0057381 | A1 | 3/2009 | Gokhale |
| 2009/0139678 | A1 | 6/2009 | Nilsson et al. |
| 2009/0142523 | A1 | 6/2009 | Nilsson et al. |
| 2009/0229180 | A1 | 9/2009 | Rich |
| 2010/0065562 | A1 | 3/2010 | Vovan |
| 2010/0122930 | A1 | 5/2010 | Manca |
| 2010/0170899 | A1 | 7/2010 | Mithal et al. |
| 2010/0200591 | A1 | 8/2010 | Myerscough |
| 2011/0036846 | A1 | 2/2011 | Corbett et al. |
| 2011/0086141 | A1 | 4/2011 | Strilich et al. |
| 2011/0220652 | A1 | 9/2011 | Corbett et al. |
| 2012/0006842 | A1 | 1/2012 | Overgaag |
| 2012/0024859 | A1 | 2/2012 | Longoni |
| 2012/0024897 | A1 | 2/2012 | Corbett et al. |
| 2012/0031901 | A1 | 2/2012 | Dudson et al. |
| 2012/0175367 | A1 | 7/2012 | Lopes et al. |
| 2012/0234717 | A1 | 9/2012 | Kirkland |
| 2013/0161230 | A1 | 6/2013 | Haering |
| 2013/0256951 | A1 | 10/2013 | Buehlmeyer et al. |
| 2013/0313257 | A1 | 11/2013 | Gartz et al. |
| 2014/0370167 | A1 | 12/2014 | Garden |
| 2015/0068945 | A1 | 3/2015 | Baker et al. |
| 2015/0068946 | A1 | 3/2015 | Baker et al. |
| 2015/0109653 | A1 | 4/2015 | Greer et al. |
| 2015/0204020 | A1 | 7/2015 | Gordon et al. |
| 2015/0258722 | A1 | 9/2015 | Hou |
| 2015/0290795 | A1 | 10/2015 | Oleynik |
| 2015/0292154 | A1 | 10/2015 | Zheng et al. |
| 2015/0343933 | A1 | 12/2015 | Weiner et al. |
| 2016/0162833 | A1 | 6/2016 | Garden |
| 2016/0214778 | A1 | 7/2016 | Goodsell et al. |
| 2016/0244917 | A1* | 8/2016 | Kuo ......................... D21J 3/00 |
| 2017/0197334 | A1 | 7/2017 | Kuo et al. |
| 2017/0203892 | A1 | 7/2017 | Buck |
| 2017/0275077 | A1 | 9/2017 | Chiang et al. |
| 2017/0305232 | A1 | 10/2017 | Vorenkamp et al. |
| 2018/0022523 | A1 | 1/2018 | Noferi |
| 2018/0029764 | A1 | 2/2018 | Chung et al. |
| 2018/0071939 | A1 | 3/2018 | Garden et al. |
| 2018/0093313 | A1 | 4/2018 | Hsiao et al. |
| 2018/0105344 | A1 | 4/2018 | Chiang |
| 2018/0121037 | A1 | 5/2018 | Wajda et al. |
| 2018/0171561 | A1* | 6/2018 | Sundblad .............. B32B 29/005 |
| 2018/0215523 | A1 | 8/2018 | Chiang |
| 2018/0339826 | A1 | 11/2018 | Chung et al. |
| 2018/0340296 | A1 | 11/2018 | Chung et al. |
| 2019/0009968 | A1 | 1/2019 | Chiang |
| 2019/0031397 | A1 | 1/2019 | Grove |
| 2019/0218711 | A1 | 7/2019 | Chung et al. |
| 2019/0300263 | A1 | 10/2019 | Chiang |
| 2019/0315564 | A1 | 10/2019 | Chung et al. |

(56) References Cited

U.S. PATENT DOCUMENTS

| | | | | |
|---|---|---|---|---|
| 2020/0024806 A1 | 1/2020 | Chung et al. | | |
| 2020/0101656 A1 | 4/2020 | Fay et al. | | |
| 2020/0180298 A1* | 6/2020 | Chisena | ............... | B29C 64/118 |
| 2020/0332473 A1 | 10/2020 | Yi et al. | | |
| 2021/0002055 A1 | 1/2021 | Chiang | | |
| 2021/0138696 A1 | 5/2021 | Gonzalez et al. | | |
| 2022/0002951 A1* | 1/2022 | Vandecruys | .............. | D21J 3/00 |
| 2022/0018071 A1* | 1/2022 | Briden | ................. | D21G 9/0027 |
| 2022/0072806 A1* | 3/2022 | Intscher-Owrang | ... | D04H 1/425 |
| 2023/0107827 A1* | 4/2023 | Briden | ................. | B29C 64/393 |
| | | | | 425/84 |

FOREIGN PATENT DOCUMENTS

| | | | | |
|---|---|---|---|---|
| CL | 201400075 | | 6/2014 | |
| CN | 2228013 Y | | 5/1996 | |
| CN | 1280946 | | 1/2001 | |
| CN | 1623022 A * | | 6/2005 | ............ D21H 21/16 |
| CN | 101342779 A | | 1/2009 | |
| CN | 301396948 S | | 12/2010 | |
| CN | 202070636 U | | 12/2011 | |
| CN | 103603234 A | | 2/2014 | |
| CN | 104827519 A | | 8/2015 | |
| CN | 104831590 A | | 8/2015 | |
| CN | 204622206 U | | 9/2015 | |
| CN | 204690510 U | | 10/2015 | |
| CN | 107881856 A | | 4/2018 | |
| CN | 107915044 A | | 4/2018 | |
| CN | 207404482 U | | 5/2018 | |
| CN | 108265568 A | | 7/2018 | |
| CN | 109454705 A | | 3/2019 | |
| CN | 111254754 A | | 6/2020 | |
| CN | 111287022 A | | 6/2020 | |
| CN | 111395050 A | | 7/2020 | |
| CN | 111395051 A | | 7/2020 | |
| CN | 114096713 A | | 2/2022 | |
| EM | 007697610-0001 | | 2/2020 | |
| EP | 0433203 A1 | | 6/1991 | |
| EP | 0559491 A1 | | 9/1993 | |
| EP | 0732181 A1 | | 9/1996 | |
| EP | 0989067 | | 3/2000 | |
| EP | 1240975 A1 | | 9/2002 | |
| EP | 1623929 | | 2/2006 | |
| EP | 2230184 | | 9/2010 | |
| EP | 2243723 | | 10/2010 | |
| EP | 3006370 | | 7/2018 | |
| EP | 2937462 B1 | | 7/2019 | |
| EP | 3985170 A1 | | 4/2022 | |
| EP | 4265840 A1 | | 10/2023 | |
| GB | 2456502 A * | | 7/2009 | ................ D21J 3/00 |
| GB | 6083330 | | 2/2020 | |
| GB | 9007697610-0001 | | 2/2020 | |
| HK | 2015592-0001 | | 7/2020 | |
| IN | 327236-001-0001 | | 2/2020 | |
| JP | S50-017584 | | 2/1975 | |
| JP | S5542187 A | | 3/1980 | |
| JP | 02-107266 | | 4/1990 | |
| JP | 07-002285 U | | 1/1995 | |
| JP | 2001-063761 | | 3/2001 | |
| JP | 2002-347944 | | 12/2002 | |
| JP | 2010-264996 | | 11/2010 | |
| JP | 5244344 | | 7/2013 | |
| JP | 2015-000743 | | 1/2015 | |
| JP | 2016513547 | | 5/2016 | |
| JP | D1579421 | | 6/2017 | |
| JP | D1585893 | | 9/2017 | |
| KR | 20040045048 A | | 6/2004 | |
| KR | 20-0360448 | | 8/2004 | |
| KR | 10-2009-0098949 | | 9/2009 | |
| KR | 10-2015-0121771 | | 10/2015 | |
| KR | 3008441790000 | | 3/2016 | |
| KR | 30-0990068 | | 1/2019 | |
| TW | 230166 | | 9/1994 | |
| TW | D131670 | | 11/2009 | |
| TW | D166244 | | 3/2015 | |
| TW | D194812 | | 12/2018 | |
| TW | D198710 | | 7/2019 | |
| TW | 208702-0001 | | 12/2020 | |
| WO | 99/22069 A1 | | 5/1999 | |
| WO | 2003044279 A1 | | 5/2003 | |
| WO | 2005012640 A1 | | 2/2005 | |
| WO | 2006057609 A1 | | 6/2006 | |
| WO | 2006057610 A2 | | 6/2006 | |
| WO | 2011083008 A1 | | 7/2011 | |
| WO | 2012/005683 | | 1/2012 | |
| WO | 2015/006649 | | 1/2015 | |
| WO | 2015019061 A1 | | 2/2015 | |
| WO | 2016101976 A1 | | 6/2016 | |
| WO | 2018237279 A1 | | 12/2018 | |
| WO | 2020227404 A1 | | 11/2020 | |
| WO | 2020227409 A1 | | 11/2020 | |
| WO | 2021/073674 | | 4/2021 | |
| WO | 2021073674 A2 | | 4/2021 | |
| WO | 2021/201850 | | 10/2021 | |
| WO | 2021201850 A1 | | 10/2021 | |
| WO | 2022/072555 | | 4/2022 | |
| WO | 2022072555 A1 | | 4/2022 | |
| WO | 2023064797 A1 | | 4/2023 | |
| WO | 2023178278 A2 | | 9/2023 | |
| WO | 2023245002 A1 | | 12/2023 | |

OTHER PUBLICATIONS

Core77 "Notable Packaging Award: Core77 Design Awards 2017, Zume Pizza 'Pizza Pod" May 14, 2017, https://web.archive.org/web/20170614144555/http://designawards.core77.com/Packaging/62804/Zume-Pizza-Pod, downloaded on Mar. 26, 2018, 4 pages.

Divya, "Sealed Air and Kuraray to Invest in Capacity at Simpsonville Facility to Produce Plant-Based Food Packaging", Mar. 22, 2019, located online on May 8, 2019 at: https://packaging360.in/news/sealed-air-invests-in-to-simpsonville-facility-to-produce-pla . . . , 7 pages.

DuPont, "Compostable "Pizza Pod" (Zume Pizza, USA)—Diamond Finalist Award," May 22, 2017, downloaded from http://www.dupont.com/industries/packaging-and-printing/media/press-kits/2017-packaging-awards/mc-image-detail/compostable-pizza-pod.html on Apr. 20, 2018, 1 page.

Entis et al., "This Robot-Made Pizza Is Baked in the Van on the Way to Your Door," Sep. 29, 2016, downloaded from http://fortune.com/2016/09/29/this-robot-made-pizza-is-baked-in-the-van-on-the-way-to-your-front-door/ on Apr. 20, 2018, 1 page.

European Search Report in Application 17770987.0, mailed Feb. 12, 2019, 8 pages.

Farkya, "Compostable Pizza Pod," Nov. 14, 2016, downloaded from http://www.packagingconnections.com/news/compostable-pizzapod.htm on Apr. 20, 2018, 7 pages.

Garden, "Systems and Methods of Preparing Food Products," Notice of Allowance, mailed Jan. 7, 2016, for U.S. Appl. No. 13/920,998, 9 pages.

Garden, "Systems and Methods of Preparing Food Products," U.S. Appl. No. 15/040,866, filed Feb. 10, 2016, 71 pages.

Garden,"Systems and Methods of Preparing Food Products," Advisory Action, mailed Aug. 27, 2015, for U.S. Appl. No. 13/920,998, 3 pages.

Garden,"Systems and Methods of Preparing Food Products," Advisory Action, mailed Jul. 29, 2015, for U.S. Appl. No. 13/920,998, 3 pages.

Garden,"Systems and Methods of Preparing Food Products," Amendment, filed Apr. 2, 2015, for U.S. Appl. No. 13,920,998, 23 pages.

Garden,"Systems and Methods of Preparing Food Products," Amendment, filed Aug. 10, 2015, for U.S. Appl. No. 13/920,998, 29 pages.

Garden,"Systems and Methods of Preparing Food Products," Amendment, filed Jul. 22, 2015, for U.S. Appl. No. 13/920,998, 29 pages.

Garden, "Systems and Methods of Preparing Food Products," Amendment, filed Sep. 25, 2015, for U.S. Appl. No. 13/920,998, 29 pages.

(56)          References Cited

OTHER PUBLICATIONS

Garden,"Systems and Methods of Preparing Food Products," Office Action, mailed Mar. 16, 2015, for U.S. Appl. No. 13/920,998, 28 pages.

Garden,"Systems and Methods of Preparing Food Products," Office Action, mailed May 27, 2015, for U.S. Appl. No. 13/920,998, 31 pages.

Gardner, "Systems and Methods of Preparing Food Products," Response to Restriction Requirement, filed Oct. 24, 2014, for U.S. Appl. No. 13/920,998, 3 pages.

Gardner, "Systems and Methods of Preparing Food Products," Restriction Requirement, mailed Sep. 10, 2014, for U.S. Appl. No. 13/920,998, 5 pages.

Kelley, Mary K., "Caffeine Fix: The Design of Coffee Cup Lids", from Mary Kate's Experience with Human Factors, found online at: https://sites.tufts.edu/mkelleyhfintro/2018/04/12/caffeine-fix-the-design-of-coffee-cup-lids/, Apr. 12, 2018, 8 pages.

Molina, "Yes, Apple really did patent its own pizza box," May 17, 2017, downloaded from https://www.usatoday.com/story/tech/talkingtech/2017/05/17/apple-patented-its-own-pizza-box/327267001/ on Apr. 20, 2018, 2 pages.

Notice of Allowance, dated Jul. 24, 2018, for U.S. Appl. No. 29/618,670, Collins et al., "Food Container," 2 pages.

Notice of Allowance, dated Jun. 6, 2018, for U.S. Appl. No. 29/618,670, Collins et al., "Food Container," 2 pages.

Notice of Allowance, dated May 31, 2018, for U.S. Appl. No. 29/574,805, Collins et al., "Food Container Cover," 2 pages.

Notice of Allowance, mailed Apr. 25, 2018, for U.S. Appl. No. 29/618,670, Collins et al., "Food Container" 7 pages.

Notice of Allowance, mailed May 9, 2018, for U.S. Appl. No. 29/574,805, Collins et al., "Food Container and Cover", 10 pages.

Office Action dated Aug. 28, 2018 issued in U.S. Appl. No. 15/845,916, 24 pages.

Office Action dated Aug. 30, 2018 issued in U.S. Appl. No. 15/936,069, 14 pages.

Office Action dated Dec. 20, 2018 issued in U.S. Appl. No. 15/465,228, 27 pages.

PCT International Preliminary Report on Patentability in International Application PCT/US2017/023408, mailed Sep. 25, 2018, 14 pages.

PCT International Preliminary Report on Patentability in Application PCT/US2018/040749, mailed Jan. 16, 2020, 20 pages.

PCT International Preliminary Report on Patentability in International Application PCT/US2019/025219, mailed Oct. 15, 2020, 11 pages.

PCT International Search Report and Written Opinion in International Application PCT/US2018/040730, mailed Nov. 14, 2018, 22 pages.

PCT International Search Report and Written Opinion in International Application PCT/US2019/025219, mailed Jul. 18, 2019, 12 pages.

PCT International Search Report and Written Opinion of the International Searching Authority, mailed Jun. 26, 2017, for International Application No. PCT/US2017/023408, 17 pages.

PCT International Search Report, mailed Oct. 22, 2014, for International Application No. PCT/US2014/042879, 3 pages.

PCT Search Report and Written Opinion dated Nov. 16, 2018, issued in International Patent Application No. PCT/US2018/040749, 24 pages.

PCT Written Opinion of the International Searching Authority, mailed Oct. 22, 2014, for International Application No. PCT/US2014/042879, 8 pages.

PW Staff, "Humanitarian initiative wins top DuPont Award," Jul. 5, 2017, downloaded from https://www.packworld.com/article/trendsand-issues/global/humanitarian-initiative-wins-top-dupont-award on Apr. 20, 2018, 12 pages.

Robinson, "This robot-made pizza in Silicon Valley should terrify Domino's and Pizza Hut," Sep. 29, 2016, downloaded from https://sg.financeyahoo.com/news/robot-made-pizza-silicon-valley-16400825.htrnl?guccounter=1 on Apr. 20, 2018, 12 pages.

U.S. Appl. No. 15/465,228, Amendment and Response filed Apr. 18, 2019, 16 pages.

U.S. Appl. No. 15/465,228, Office Action mailed Feb. 26, 2020, 27 pages.

U.S. Appl. No. 15/465,228, Office Action mailed Jul. 18, 2019, 26 pages.

U.S. Appl. No. 15/845,916, Amendment and Response filed Dec. 28, 2018, 17 pages.

U.S. Appl. No. 15/845,916, Office Action mailed Apr. 13, 2020, 22 pages.

U.S. Appl. No. 15/845,916, Office Action mailed Apr. 8, 2019, 25 pages.

U.S. Appl. No. 15/845,916, Office Action mailed Aug. 14, 2019, 23 pages.

U.S. Appl. No. 15/936,069, Amendment and Response filed Nov. 28, 2018, 14 pages.

U.S. Appl. No. 15/936,069, Notice of Allowance mailed Mar. 4, 2020, 5 pages.

U.S. Appl. No. 15/936,069, Notice of Allowance mailed May 7, 2020, 2 pages.

U.S. Appl. No. 15/936,069, Notice of Allowance mailed Jun. 17, 2020, 2 pages.

U.S. Appl. No. 15/936,069, Office Action mailed Mar. 14, 2019, 17 pages.

U.S. Appl. No. 15/936,069, Office Action mailed Aug. 14, 2019, 16 pages.

U.S. Appl. No. 16/029,047, Notice of Allowance mailed Jan. 13, 2020, 7 pages.

U.S. Appl. No. 16/029,047, Notice of Allowance mailed Mar. 11, 2020, 2 pages.

U.S. Appl. No. 16/029,047, Notice of Allowance mailed Apr. 3, 2020, 2 pages.

U.S. Appl. No. 16/029,047, Office Action mailed Aug. 7, 2019, 6 pages.

U.S. Appl. No. 29/558,872, Amendment and Response filed Feb. 1, 2019, 23 pages.

U.S. Appl. No. 29/558,872, Ex-Parte Quayle Action mailed Nov. 18, 2019, 10 pages.

U.S. Appl. No. 29/558,872, Notice of Allowance mailed Mar. 27, 2020, 7 pages.

U.S. Appl. No. 29/558,872, Notice of Allowance mailed May 10, 2019, 9 pages.

U.S. Appl. No. 29/558,872, Notice of Allowance mailed Jun. 26, 2019, 14 pages.

U.S. Appl. No. 29/558,872, Office Action mailed Nov. 1, 2018, 15 pages.

U.S. Appl. No. 29/558,872, Response to Restriction Requirement filed Aug. 16, 2018, 7 pages.

U.S. Appl. No. 29/558,872, Restriction Requirement mailed May 17, 2018, 12 pages.

U.S. Appl. No. 29/558,873, Ex Parte Quayle Action mailed Sep. 6, 2018, 9 pages.

U.S. Appl. No. 29/558,873, Notice of Allowance mailed Feb. 8, 2019, 9 pages.

U.S. Appl. No. 29/558,873, Notice of Allowance mailed Jun. 26, 2019, 11 pages.

U.S. Appl. No. 29/558,873, Response filed Nov. 6, 2018, 18 pages.

U.S. Appl. No. 29/558,873, Response to Restriction Requirement filed Jul. 17, 2018, 16 pages.

U.S. Appl. No. 29/558,873, Restriction Requirement mailed May 17, 2018, 9 pages.

U.S. Appl. No. 29/558,874, Ex Parte Quayle Action mailed Feb. 27, 2020, 11 pages.

U.S. Appl. No. 29/558,874, Ex Parte Quayle Action mailed Sep. 6, 2018, 10 pages.

U.S. Appl. No. 29/558,874, Notice of Allowance mailed Feb. 13, 2019, 10 pages.

U.S. Appl. No. 29/558,874, Notice of Allowance mailed Jun. 2, 2020, 7 pages.

U.S. Appl. No. 29/558,874, Restriction Requirement mailed Apr. 27, 2018, 10 pages.

U.S. Appl. No. 29/574,802, Amendment and Response filed Aug. 3, 2017, 7 pages.

(56) References Cited

OTHER PUBLICATIONS

U.S. Appl. No. 29/574,802, Notice of Allowance mailed Aug. 25, 2017, 5 pages.
U.S. Appl. No. 29/574,802, Office Action mailed Jun. 1, 2017, 9 pages.
U.S. Appl. No. 29/574,805, Notice of Allowance mailed Jul. 23, 2018, 2 pages.
U.S. Appl. No. 29/574,808, Amendment and Response filed Dec. 21, 2018, 15 pages.
U.S. Appl. No. 29/574,808, Notice of Allowance mailed May 13, 2019, 5 pages.
U.S. Appl. No. 29/574,808, Notice of Allowance mailed Jun. 10, 2019, 10 pages.
U.S. Appl. No. 29/574,808, Office Action mailed Sep. 21, 2018, 11 pages.
U.S. Appl. No. 29/574,808, Response to Restriction Requirement filed Aug. 1, 2018, 1 page.
U.S. Appl. No. 29/574,808, Restriction Requirement mailed Jun. 1, 2018, 9 pages.
U.S. Appl. No. 29/656,406, Notice of Allowance mailed Jan. 23, 2020, 10 pages.
U.S. Appl. No. 29/656,406, Notice of Allowance mailed Mar. 25, 2020, 2 pages.
U.S. Appl. No. 29/656,406, Notice of Allowance mailed Jun. 20, 2019, 12 pages.
U.S. Appl. No. 29/656,406, Notice of Allowance mailed Aug. 6, 2019, 2 pages.
U.S. Appl. No. 29/698,689, Notice of Allowance mailed Apr. 6, 2020, 5 pages.
U.S. Appl. No. 29/698,689, Office Action mailed Oct. 24, 2019, 12 pages.
U.S. Appl. No. 29/700,713, Notice of Allowance mailed Apr. 8, 2020, 8 pages.
U.S. Appl. No. 29/700,713, Notice of Allowance mailed Jun. 15, 2020, 2 pages.
U.S. Appl. No. 29/700,713, Notice of Allowance mailed Jul. 6, 2020, 2 pages.
U.S. Appl. No. 29/701,925, Notice of Allowance mailed Jan. 13, 2021, 9 pages.
U.S. Appl. No. 29/701,925, Notice of Allowance mailed Feb. 22, 2021, 2 pages.
U.S. Appl. No. 29/701,931, Notice of Allowance mailed Oct. 24, 2022, 9 pages.
U.S. Appl. No. 29/701,935, Ex-Parte Quayle Action mailed Nov. 10, 2020, 8 pages.
U.S. Appl. No. 29/701,937, Office Action mailed Oct. 5, 2020, 8 pages.
U.S. Appl. No. 29/707,214, Ex-Parte Quayle Action mailed Dec. 2, 2021, 5 pages.
U.S. Appl. No. 29/707,214, Notice of Allowance mailed Apr. 14, 2021, 5 pages.
U.S. Appl. No. 29/707,214, Notice of Allowance mailed May 2, 2022, 5 pages.
U.S. Appl. No. 29/707,214, Office Action mailed Oct. 2, 2020, 15 pages.
Wiener, "Food Movers: The Secret Evolution of the Pizza Box," Feb. 2016, downloaded from https://www.foodandcity.org/evolution-pizza-box/ on Apr. 20, 2018, 14 pages.
World Centric website, "New PizzaRound from World Centric: The Pizza Box Comes Full Circle", Petaluma, CA, USA, published Mar. 15, 2018, 2 pages, located online on May 2, 2019 at: http://www.worldcentric.org/node/442.
Zume Pizza Homepage: Announced 2015 [Online]. Site Visited [Apr. 20, 2018]. Available from Internet URL: https://zumepizza.com/, 7 pages.
U.S. Appl. No. 29/701,931, Notice of Allowance mailed Feb. 13, 2023, 8 pages.
PCT International Search Report and Written Opinion in International Application PCT/US2022/077950, mailed Jan. 11, 2023, 12 pages.
PCT International Preliminary Report on Patentability in International Application PCT/US2021/052731 mailed Apr. 13, 2023, 10 pgs.
International Search Report and Written Opinion received for PCT Serial No. PCT/US2021/052731 on Feb. 2, 2022, 14 pgs.
International Search Report and Written Opinion for Application No. PCT/US2023/064583, mailed Oct. 17, 2023, (11 pages).
International Search Report and Written Opinion for Application No. PCT/US2023/068343, mailed Oct. 11, 2023, (13 pages).
PCT International Search Report and Written Opinion for Application No. PCT/US2020/031667, mailed Jul. 22, 2020, (11 pages).
PCT International Search Report and Written Opinion for Application No. PCT/US2020/031675, mailed Jul. 27, 2020 (9 pages).

* cited by examiner

Cubic infill is a 3D cube pattern with each cube staked on corners

3D Honeycomb is a true honeycomb pattern

Infill patterns varying densities. Left to Right: 20%, 40%, 60%, 80%.
Top to Bottom: Honeycomb, Concentric, Line, Rectilinear, Hilbert Curve,
Archimedean Chords, Octagram Spiral

900

902 — Input/receive manufacturing line and mold parameter information

904 — Input/receive part model

906 — Receive user command to generate mold model(s)

908 — Create mold model(s)

910 — Slice mold model(s)

912 — Print molds

914 — Assemble molds and processing machines

916 — Manufacture molded fiber part

Section A-A

Side View

Bottom View

Side View

Top View

Section B-B

Side View

Top View

Side View

Bottom View

POROUS MOLD FOR MOLDED FIBER PART MANUFACTURING AND METHOD FOR ADDITIVE MANUFACTURING OF SAME

CROSS-REFERENCE TO RELATED APPLICATIONS

This application is a National Stage Application of PCT/US2021/052731, filed 29 Sep. 2021, which claims the benefit of and priority to U.S. Provisional Application No. 63/084,736, filed Sep. 29, 2020, which application is hereby incorporated herein by reference.

INTRODUCTION

Pollution caused by single use plastic containers and packaging materials is now a recognized worldwide problem. Replacing single use packaging with biodegradable and compostable materials is proposed as one way to reduce plastic pollution. However, for a new environmentally friendly replacement to be successful, it must be competitive in both cost and performance to the incumbent plastic technologies it is to replace.

By way of brief background, molded paper pulp (also referred to as molded fiber) has been used since the 1930s to make containers, trays and other packages (referred to as the "part" to be made). Paper pulp can be produced from recycled materials such as old newsprint and corrugated boxes or directly from tree and other plant fibers. Today, molded pulp parts are widely used for electronics, household goods, food packaging, automotive pieces, and medical products.

Typically, molded fiber parts are made using a forming mold that is the negative shape, if you will, of a side of the part. For example, a forming mold may be the negative of the inside of a bowl or an egg cartoon. Currently, forming molds are made by machining a metal tool, often from a single piece of billet of aluminum or similar metal. Holes are then drilled through the tool and a screen is attached to its surface. To make the molded fiber part, the forming mold is immersed into a slurry of fiber in a machine called a former. A pressure gradient is applied between the slurry and the back of tool forcing the slurry water to be drawn through the holes in the forming mold. The pressure gradient may be created by pulling a vacuum on the back side of the tool. The screen prevents the pulp from clogging the holes and a layer of fiber from the slurry collects on the screen over time as water is drawn through the forming mold. After the fiber layer is formed to a desired thickness, the forming mold with the molded fiber part is removed from the slurry. The molded fiber part is then removed from the forming mold and may be subjected to subsequent processing (e.g., transferring to other equipment, pressing, heating, drying, top coating, palletizing, labeling, trimming, and the like).

The subsequent processes often use one or two processing molds in which each processing mold is negative of one or the other side of the part. For example, a press may use a processing mold that closely or identically matches the forming mold and a second processing mold that defines the shape of opposite side of the part. The part ultimately takes the shape created from the space between the two molds when they are pressed together. Other processes may use only one processing mold, such as a transfer process (sometimes referred to as "pick and place" process) that moves a part from a mold on one machine to a mold on another, e.g., from the former to a press or from a press to a pallet where the parts are stacked. Although processing molds typically do not have screens like forming molds, it is typical for processing molds to have holes through which a pressure gradient can be created, e.g., to use suction to firmly draw a part onto the mold, to blow the part off the mold, or through which additional water can be removed from the part, depending on the particular process. It is common for all molds on a manufacturing line to have such holes.

The two most common types of molded pulp are classified as Type 1 and Type 2. Type 1 is commonly used for support packaging applications with $\frac{3}{16}$ inch (4.7 mm) to $\frac{1}{2}$ inch (12.7 mm) walls. Type 1 molded pulp manufacturing, also known as "dry" manufacturing, uses a fiber slurry made from ground newsprint, kraft paper, or other fibers dissolved in water. A forming mold mounted on a platen is dipped or submerged in the slurry and a vacuum is applied to the back of the forming mold. The vacuum pulls the slurry onto the mold to form the shape of the part. While still under the vacuum, the mold is removed from the slurry tank. The pressure gradient is then reversed, typically by blowing air through the tool, to eject the molded fiber piece. The ejected part is typically deposited onto a conveyor that moves through a drying oven (hence the term "dry manufacturing") to complete the manufacturing of the part.

Type 2 molded pulp manufacturing, also known as "wet" manufacturing, is typically used for packaging electronic equipment, cellular phones, and household items with containers that have 0.02 inch (0.5 mm) to 0.06 inch (1.5 mm) walls. Type 2 molded pulp uses the same materials. The molding process differs from Type 1 manufacturing in that after the initial part (referred to as the "wet part") is made on the forming mold, the wet part is moved to a press and subjected to a pressing step that compresses the fiber material between two processing molds. This removes additional water, increases the density of the part, and provides an external surface finish to both sides of the part.

Type 3 molded pulp manufacturing, another form of "wet" manufacturing, includes at least one higher temperature process, such as hot pressing of the wet part in addition to the forming process.

Porous Molds for Molded Fiber Part Manufacturing and Method for Additive Manufacturing of Same This disclosure describes systems and methods for creating porous molds using additive manufacturing processes such as three-dimensional (3D) printing. At a high level, it has been found that creating a generally porous mold, or a mold with porous regions or zones, can improve the performance of the mold and the quality of the parts created therefrom. It has further been determined that porous molds can be created using additive manufacturing techniques through manipulation of mold manufacturing parameters such as, but not limited to, layer thickness, number of perimeter layers, fill pattern, and fill density. Through variation of these manufacturing parameters, the porosity of a mold created by an additive manufacturing device, e.g., a 3D printer, can be tailored for use with molded fiber. For example, the fill density and fill pattern parameters may be tailored based on such things as surface angle relative to the printing layer plane will prevent entry and clogging of the mold with fibers from the fiber slurry during the part forming process, thus removing the need for a wire mesh screen required in the prior art.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure.

DETAILED DESCRIPTION

Figure 1:
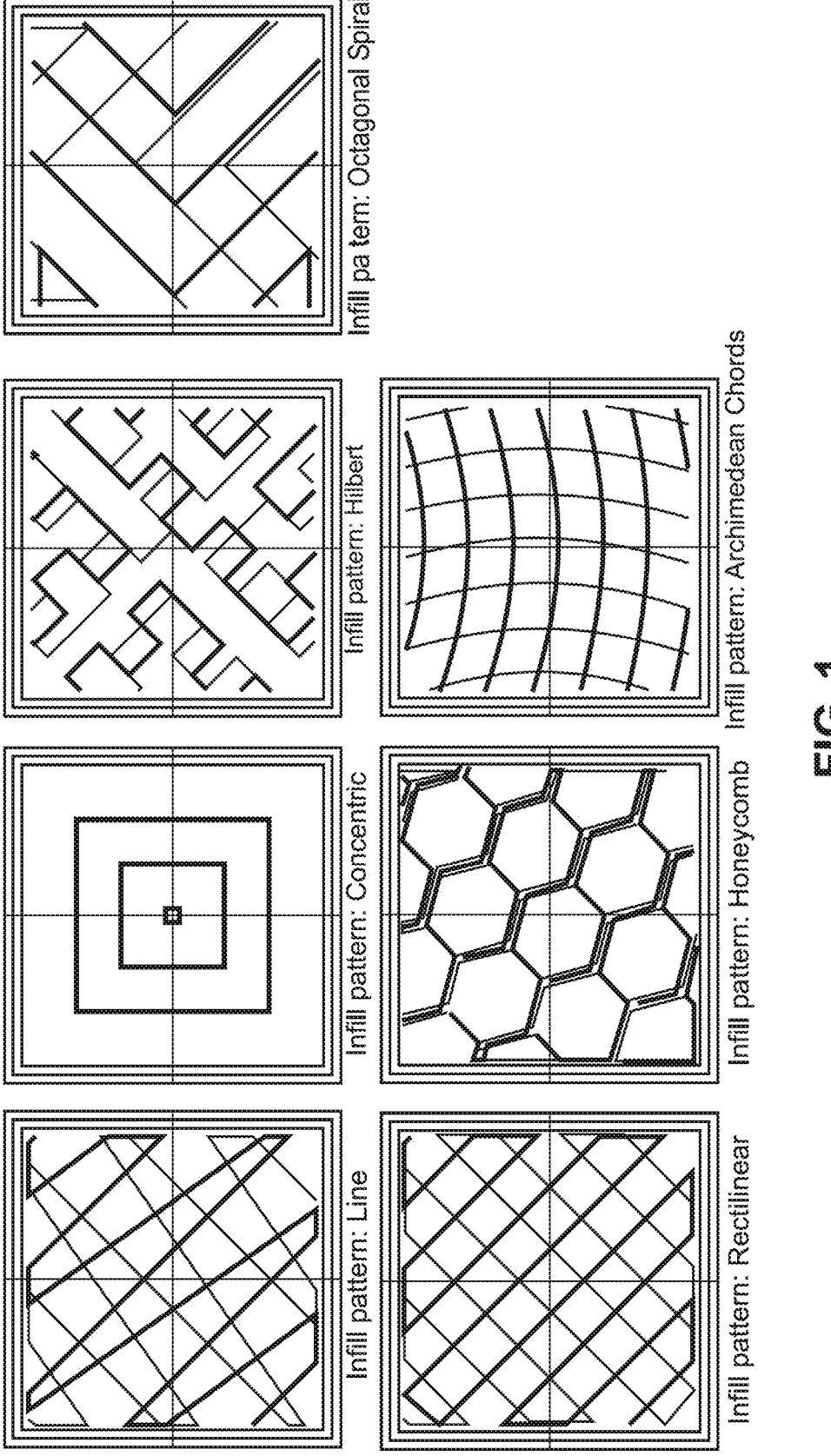
FIG. 1 illustrates a number of common 2-dimensional (2D) infill patterns that can be selected and generated by slicer software programs, in this case the open source Slic3r program.

Before the porous molded fiber product molds and methods for their manufacture are disclosed and described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise. Thus, for example, reference to "a step" may include multiple steps, and reference to "producing" or "products" of a step or action should not be taken to be all of the products.

One drawback of the current mold manufacturing process is the time and cost associated with creating molds by individually milling them out metal billet. Molds are expensive and time consuming to manufacture. Furthermore, such molds are heavy, even if made of a light metal such as aluminum, thus requiring the processing equipment to be very strong in order to handle the weight of the molds. In addition, as mentioned above it is typical for molds, be they forming molds or processing molds, to be provided with holes through which a pressure gradient can be created. It has been determined that the size, number, and spacing of the holes can have a significant effect on the quality of the final part, the efficiency of the process in which the mold is used, and the consistency between parts produced by the mold. Forming molds have an additional drawback in that the screens used to prevent clogging of the holes often clog themselves, are quick to wear out, have time consuming and costly maintenance cycles, and can introduce unwanted contaminating material into the slurry or the part.

This disclosure describes systems and methods for creating porous molds using additive manufacturing processes such as three-dimensional (3D) printing. At a high level, it has been found that creating a generally porous mold, or a mold with porous regions or zones, can improve the performance of the mold and the quality of the parts created therefrom. It has further been determined that porous molds can be created using additive manufacturing techniques through manipulation of mold manufacturing parameters such as, but not limited to, layer thickness, number of perimeter layers, fill pattern and fill density. Through variation of these manufacturing parameters, the porosity of a mold created by an additive manufacturing device, e.g., a 3D printer, can be tailored for use with molded fiber. For example, the fill density and fill pattern parameters may be tailored to prevent entry and clogging of the mold with fibers from the fiber slurry during the part forming process, thus removing the need for a wire mesh screen.

The benefits of porous molds created from additive manufacturing techniques are many. First, the porosity of the mold can be easily adjusted. Furthermore, as this method results in a mold that is substantially homogenous, the application of the vacuum to the mold is much more evenly distributed throughout the mold, instead of being localized around the discrete holes drilled into a traditional mold. This improves the overall quality of the part created from the mold.

Second, molds can be quickly designed and manufactured. In fact, molds can be partially or completely auto generated from a given part design and intended use. That is, given a specific computer model for a desired molded fiber part, a computer model for each of the porous forming and processing molds necessary for any particular manufacturing line can be generated by simply dictating the desired attributes of the molds such as porosity and shape of the machine interface. Furthermore, preconfigured profiles for printer parameters can be created to tailor the porosity and surface pore sizes of the printed molds depending on the type of fiber and fiber slurry being. For example, molds for slurry A may be printed with printer parameters previous determined to be optimized for that particular slurry composition, while molds for slurry B are automatically printed using a different set of optimal printer parameters.

Third, mold designs can be easily modified and a new mold made quickly in case a change is needed. Provided with the appropriate additive manufacturing device, a molded fiber manufacture no longer needs to wait weeks for new molds to be machined. Inexpensive and quickly made molds will allow more flexibility and make smaller part runs more economical.

Finally, depending on the material used when molds are worn out, they may be recycled and new molds created from the original material.

Additive Manufacturing

By way of background, additive manufacturing techniques, which are sometimes also referred to as 3D printing, start from a digital representation of the 3D object to be formed, referred to herein as the "computer model," or simply "model" of the desired object. In one common technique, the model is then subdivided, or "sliced", into a series of cross-sectional layers. The layers represent the 3D object and may be generated using additive manufacturing software executed by a computing device, typically referred to as a "slicer" or "slicing software." Information about the cross-sectional layers of the 3D object may be stored as cross-sectional data in a slicer file, which sometimes also called a g-code file after the standard slicer file format. Typically, a slicer file includes specific instructions to the printer including, but not limited to, the precise order of linear movements of the additive manufacturing device extruder, fixation laser, or equivalent for each layer. In addition, the g-code file typically includes specific printer commands like the ones to control the extruder temperature or bed temperature.

An additive manufacturing or 3D printing machine or system can read and interpret the g-code file to build a 3D physical replica of the modeled object on a layer-by-layer basis. Accordingly, additive manufacturing or 3D printing allows for fabrication of 3D objects directly from computer models of the objects, such as computer aided design (CAD) files. Additive manufacturing or 3D printing provides the ability to quickly manufacture both simple and complex parts without tooling and without the need for assembly of different parts.

Examples of additive manufacturing and/or three-dimensional printing techniques include stereolithography, selective laser sintering, fused deposition modeling (FDM), droplet jetting technologies, high area rapid printing (HARP), ultraviolet light activated resin printers, and the like. Stereolithography ("SLA"), for example, utilizes a vat of liquid photopolymer "resin" to build an object a layer at a time using light to selectively photopolymerize the resin. Each layer includes a cross-section of the object to be formed. First, a layer of resin is deposited over the entire building area. For example, a first layer of resin may be deposited on a base plate of an additive manufacturing system. An electromagnetic ray then traces a specific pattern on the surface of the liquid resin. The electromagnetic ray may be delivered as one or more laser beams which are computer controlled. Exposure of the resin to the electromagnetic ray cures, or solidifies, the pattern traced by the electromagnetic ray, and causes it to adhere to the layer below. After a coat of resin has been had been polymerized, the platform descends by a single layer thickness and a subsequent layer of liquid resin is deposited. A pattern is traced on each layer of resin, and the newly traced layer is adhered to the previous layer. A complete, physical 3D object may be formed by repeating this process. The solidified 3D object may be removed from the SLA system and processed further in post-processing.

Selective laser sintering ("SLS") is another additive manufacturing technique that uses a high-power laser, or another focused energy source, to fuse small fusible particles of solidifiable material. In some embodiments, selective laser sintering may also be referred to as selective laser melting. In some embodiments, the high-power laser may be a carbon dioxide laser for use in the processing of, for example, polymers. In some embodiments, the high-power laser may be a fiber laser for use in the processing of, for example, metallic materials. Those of skill in the art will recognize that, in some embodiments, other types of high-power lasers may be used depending on the particular application. The particles may be fused by sintering or welding the particles together using the high-power laser. The small fusible particles of solidifiable material may be made of plastic powders, polymer powders, metal (direct metal laser sintering) powders, or ceramic powders (e.g., glass powders, and the like). The fusion of these particles yields an object that has the desired 3D shape and properties such as porosity and surface texture. For example, a first layer of powdered material may be deposited on a base plate. A laser may be used to selectively fuse the first layer of powdered material by scanning the powdered material to create and shape a first cross-sectional layer of the 3D object. After each layer is scanned and each cross-sectional layer of the object is shaped, the powder bed may be lowered by one layer of thickness, a new layer of powdered material may be applied on top of the previous layer, and the process may be repeated until the build is completed and the object is generated. The cross-sectional layers of the 3D object may be generated from a digital 3D description of the desired object. The 3D description may be provided by a CAD file or from scan data input into a computing device. The solidified 3D object may be removed from the SLS system and processed further in post-processing.

Suitable additive manufacturing or 3D printing systems for use herein include, but are not limited to, various implementations of SLA and SLS technology. Materials used may include, but are not limited to, high performance polymers such as polyurethane, thermoplastic polyurethane, polypropylene, polyethylene, polyetherimide, polyamide, polyamide with additives such as glass or metal particles, including block copolymers, resorbable materials such as polymer-ceramic composites, and polyacrylamide, polystyrene, polycarbonate, acrylonitrile butadiene styrene (ABS), polyoxymethylene (POM), polyvinyl chloride, polyesters. Examples of commercially available materials include: DSM Somos® series of materials 7100, 8100, 9100, 9420, 10100, 11100, 12110, 14120 and 15100 from DSM Somos; ABSplus-P430, ABSi, ABS-ESDI, ABS-M30, ABS-M30i, PC-ABS, PC-ISO, PC, any one of the high heat resistance thermoplastics sold under the trademark ULTEM® (e.g., ULTEM 1010 Resin, ULTEM 9085 CG Resin, ULTEM 9085 Resin, ULTEM 1000 Resin), PPSF, and PPSU materials from Stratasys (note, ULTEM® is a registered trademark of SABIC Global Technologies for thermoplastic formulations which is licensed to multiple 3D filament suppliers such as Stratasys); Stratasys compatible 3D printing filaments sold under the TriMax™ brand by TriMax3D, such as TriMax™ PEI made using ULTEM 1010 or ULTEM 9085 PEI; Accura Plastics and/or Resins, DuraForm, Cast-Form, Laserform and VisiJet line of materials from 3-D-Systems; metals such as aluminum, molybdenum, cobalt, chrome, iron, nickel, titanium, vanadium and alloys thereof (e.g., stainless steel); the PA line of materials, the PrimeCast and PrimePart materials, Alumide® and CarbonMide® from EOS GmbH; the PA product line of materials from Arkema, comprising Orgasol® Invent Smooth, Rilsan® Invent Natural, Rilsan® Invent Black; Tusk Somos® SolidGrey3000, TuskXC2700T, Tusk2700 W, Poly1500, Xtreme, NanoTool, Protogen White, WaterClear; polyethylene, (met) acrylates, and epoxies.

In particular, materials with good thermal stability at higher temperatures (e.g., above 25° C.) materials such as polyetherimides (e.g., ULTEM 1010 PEI and TriMax™ PEI made using ULTEM 1010) and polyphenylsulfone (PPSU) (a transparent and rigid high-temperature engineering thermoplastic) are suitable for use as mold material for high temperature processes like hot pressing. Lower temperature materials such as ABS, such as ABS-M30i, and PLA are suitable for non-heated processes such as part transfer, trimming, labeling, embossing, forming, and palletizing processes. In addition, for making molded fiber parts for use in food packaging, a food safe, edible, or even digestible, material may be used for molds.

While many additive manufacturing machines print objects in one material, some additive manufacturing technologies allow for printing in more than one material (multi-material). These technologies are typically the ones relying on the principle of selective deposition of material as opposed to the ones relying on selective polymerization or melting in a bed/vat. Several examples of this technology include: FDM, Polyjet, Arburg Freeform technology, high-area rapid printing systems from Azul™, Binderjetting technologies like Voxeljet and Z-corp, where a binding agent is jetted on a powder bed, Stratasys product line: Dimension 1200es, Dimension Elite, Fortus 250mc, Objet24, Objet30 Pro, Objet Eden260V, Objet Eden350/350V, Objet Eden500V, Objet260 Connex, Objet350 Connex, Objet500 Connex, Objet500 Connex3; 3DSytems product line: Pro-Jet® 3510 SD, ProJet® 3510 HD, ProJet® 3510 HDPlus, ProJet® 3500 HDMax, ProJet® 5000, ProJet® 5500X, iPro™ 8000, ProX™ 950, sPro™ 140, or VX 1000 to name but a few. Technologies able to print in multi-material may be particularly suited for making molds that require different thermal properties in different locations, such as a processing mold for a hot press in which the surface of the mold needs to be maintained at a particular temperature but the temperature of the interior of the mold or at the interface with the press machine is not important. Furthermore, molds could be created with multiple materials having different properties. For example, wear surfaces may be created in a different material than non-wear surfaces due to cost savings, compressive strength, and/or durability properties of the material. Additionally, molds may be designed to have multiple parts to enable replacement of only a subset of the entire mold and these parts may each be made out of a different material having optimal properties, e.g., strength, temperature stability, durability, thermal conductivity and/or electrical conductivity or combinations thereof) for the role of that part.

Porous Molds for Molded Fiber Part Manufacturing

As described above, porous molds have benefits over traditional milled molds provided with discrete holes for air flow. Depending on the embodiment, these benefits include more uniform application of the pressure differential over the surface of the mold and reduced susceptibility to fouling with fibers from the slurry.

Porous molds could be manufactured in many ways, including using traditional milling to form a mold out of a single piece of porous material such as an open-cell ceramic material or metal foam. However, it has been determined that additive manufacturing technology may be adapted to create an additive manufacturing porous molds having sufficient porosity to allow the molds to operate as a forming mold without the use of a metal screen and as a processing mold. Furthermore, depending on the selection of the mold material molds can be manufactured that are suitable for use in cold (15° C. and less), ambient (15-25° C.) and high temperature (25° C. up to 400° C. or even higher-noting that a typical hot press mold which may operate at temperatures in the range of from 160 to 200° C.) processes. Finally, the ease, speed and lower cost at which molds can be created using additive manufacturing all represent significant improvements over the use of traditional manufacturing to create porous molder fiber molds.

When adapting additive manufacturing systems for creating porous molds, it has been determined that porous molds may be created through selection and control of mold manufacturing parameters commonly provided by slicer software programs. One of the functions performed by the slicer software program is to allow the user to dictate how the interior of an object (the "infill", or more simply the "fill") is to be made. User settable controls specifically related to the infill include, but are not limited to, infill pattern (alternatively referred to as the fill pattern), and infill density (alternatively referred to the fill density). Through selection of a particular fill pattern and a fill density, the user can control how the infill of the mold is made. It has been determined that selection of specific combinations of fill patterns and fill densities result in porous infills that allow for fluid transfer through the interior of the mold when subjected to pressure differentials.

FIG. 1 illustrates a number of common 2-dimensional (2D) infill patterns that can be selected and generated by slicer software programs, in this case the open source Slic3r program. The figure illustrates examples of, for each particular fill pattern, where fill lines would be deposited for two successive layers of the printed object. These patterns are mathematically generated by the slicer software for each layer based on mathematical rules specific to each pattern. In addition, a slicer program may adjust the exact location or orientation of lines of fill based on the shape of the perimeter of each particular layer being made, the location of infill line on the layer or layers below a given layer, and the fill density chosen. Many patterns are known in the art in addition to those shown.

Figure 10:
FIG. 10 is a photograph of printed parts showing another potentially useful 2D infill pattern: the gyroid pattern.

FIG. 10 is a photograph of printed parts showing another potentially useful infill pattern: the gyroid pattern. The gyroid pattern is an infill pattern alternates every layer and creates an equal distribution of strength within a printed object in every direction.

Figure 2A:
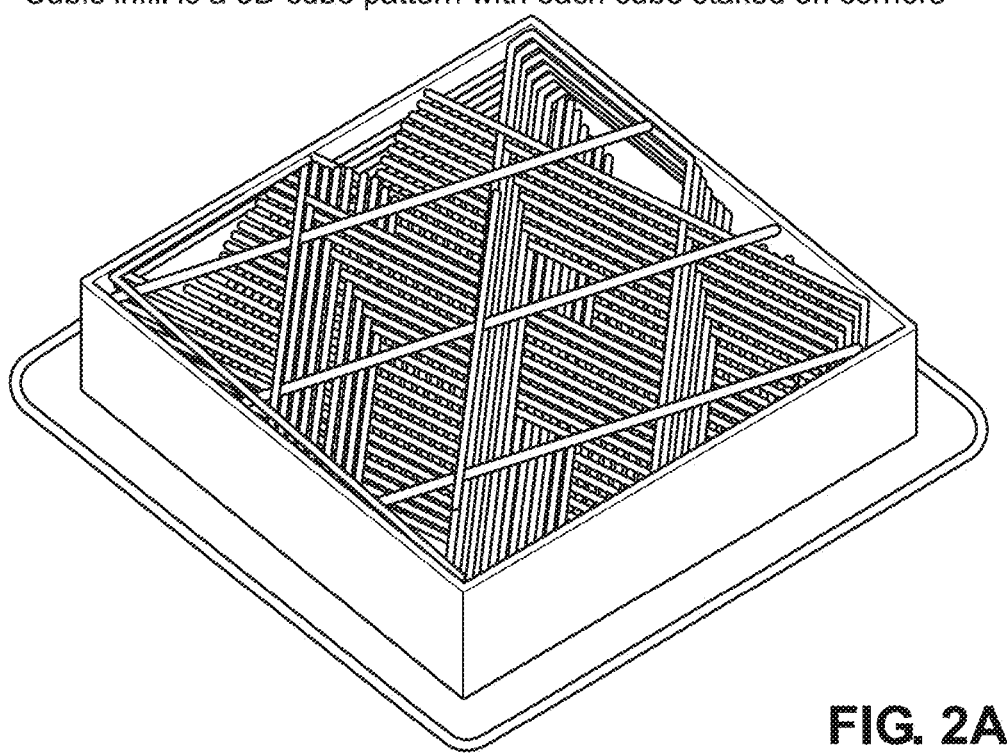
FIGS. 2A and 2B illustrate 3D infill patterns that are more specifically three-dimensional in nature.
Figure 2B:
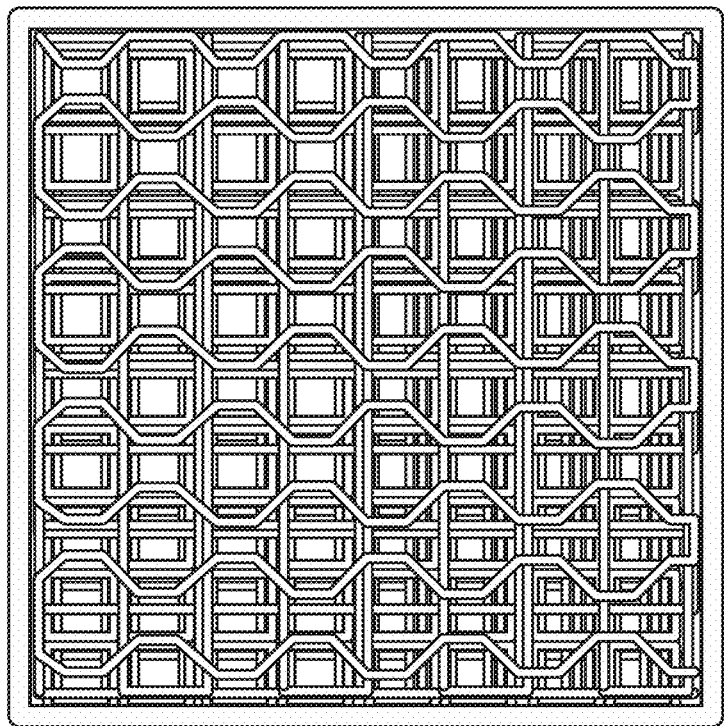

FIGS. 2A and 2B illustrate 3D infill patterns that are more specifically three-dimensional in nature. Although 2D fill patterns may take into account and adjust for infill lines in prior layers, 3D fill patterns are truly three-dimensional and designed to create a specific 3D dimensional infill. The examples of the 3D fill patterns shown in FIG. 2A is Cubic and in FIG. 2B is 3D honeycomb.

Figure 3:
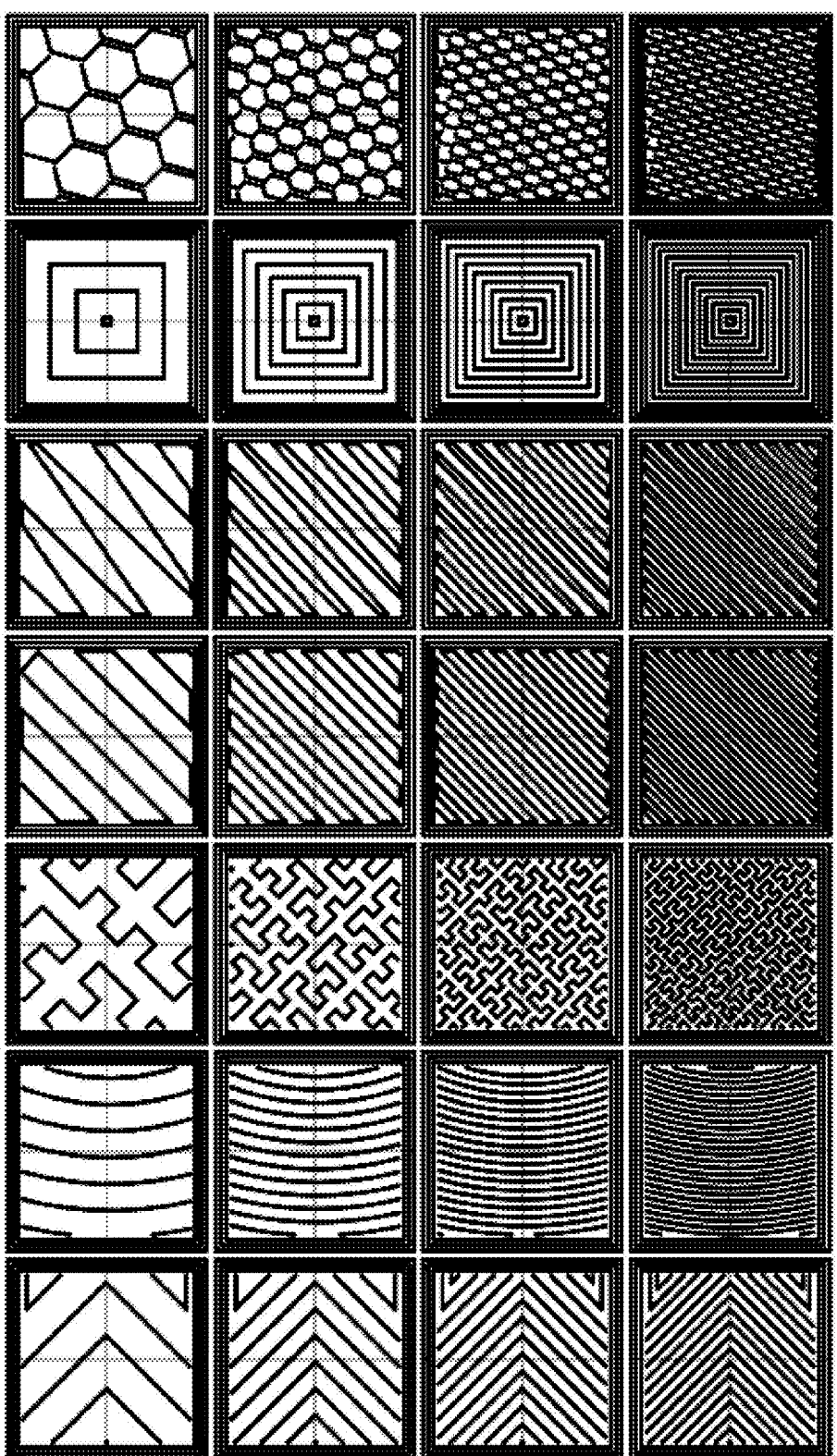
FIG. 3 illustrates the effect of fill density on where infill lines are placed for different 2D infill patterns.

FIG. 3 illustrates the effect of fill density on where infill lines are placed for different 2D infill patterns. From left to right, the fill densities are 20%, 40%, 60%, and 80%. From top to bottom, the fill patterns are Honeycomb, Concentric, Line, Rectilinear, Hilbert Curve, Archimedean Chords, and Octagram Spiral.

These above-described infill setting directly affect the resulting porosity of the infill of an object. Through variation of these manufacturing parameters, the porosity of a mold created by an additive manufacturing device, e.g., a 3D printer, can be tailored for use with molded fiber.

Some slicing software provides for additional controls on the infill created by the printer when making an object. For example, the open source Slic3r software product includes the following advanced infill parameters which could be modified to adjust the porosity of the final object and also change the fouling performance of the object as a forming or other process mold:

a. Infill every n layers—Will produce sparse vertical infill by skipping a set number of layers. This can be used to speed up print times where the missing infill is acceptable.

b. Only infill where needed—Slic3r will analyze the model and choose where infill is required in order to support internal ceilings and overhangs. Useful for reducing time and materials.

c. Solid infill every n layers—Forces a solid fill pattern on the specified layers. Zero will disable this option.

d. Fill angle—By default the infill pattern runs at 45° to the model to provide the best adhesion to wall structures. Infill extrusions that run adjacent to perimeters are liable to de-laminate under stress. Some models may benefit from rotating the fill angle to ensure the optimal direction of the extrusion.

e. Solid infill threshold area—Small areas within the model are usually best off being filled completely to provide structural integrity. This will however take more time and material and can result in parts being unnecessarily solid. Adjust this option to balance these needs.

f. Only retract when crossing perimeters—Retracting, to prevent ooze, is unnecessary if the extruder remains within the boundaries of the model. Care should be taken if the print material oozes excessively, as not retracting may result in enough material loss to affect the quality of the subsequent extrusion. However, most modern printers and materials rarely suffer from such extreme ooze problems.

g. Infill before perimeters—Reverses the order in which the layer is printed. Usually, the perimeter is laid down initially, followed by the infill, and this is usually the preferable as the perimeter acts as a wall containing infill.

Other parameters may be available in different slicer software packages and custom parameters may be developed specifically to control porosity of the finished mold. For example, sophisticated slicer programs now allow a user to designate different portions within a model and separately assign print parameters to each portion. This allows a user, for example, vary the infill pattern and infill density between different locations within an object when it is printed.

It has been determined that certain combinations of infill patterns and infill density selections create porous molds with small enough pore sizes as to be suitable for use as forming and process molds for molded fiber production. It has been determined any infill pattern set to an infill density of from 40-85% will create an interior infill region sufficiently porous to allow a pressure differential to draw water from a fiber slurry through the interior of the printed mold while preventing substantial amounts of fiber flowing through the mold. Furthermore, it appears that the use of either the rectilinear or gyroid infill patterns at a fill density of between 20-85% or more narrowly between 70-80% for fiber contact surfaces (see below regarding how fiber contact surfaces are made) are particularly suitable for use in created porous molds for molded fiber part manufacturing.

In addition to the infill print parameters, it has been determined that exterior print parameters have an effect on the overall porosity of printed molds. Typically, a printed object will be provided with a continuous exterior surface and most slicer software is set to default to having the entire exterior of the object have one to three layers of material, that is the default setting are that all exterior surfaces of an object will have from one to three layers of material between the exterior of the object and the infilled region of the object. This, of course, renders such objects non-porous as there is no open connection between the exterior of the completed object and the porous infill.

It has been determined that setting the parameters related to the number layers for the exterior surface to "zero" results in the printer creating an object with no external surface, or skin, thus exposing the infill region to the external environment. Effectively, this creates a fiber contact surface on the mold with a large number of pores connecting the infill structure created by the layers of infill pattern to the external environment. With this technique, a porous mold may be easily created using commonly available additive manufacturing equipment and software.

Uniform, Single Zone Molds

The simplest type of porous mold is a homogeneous mold created from a single print using the same material and the same infill pattern and density setting throughout the mold.

Figure 4:
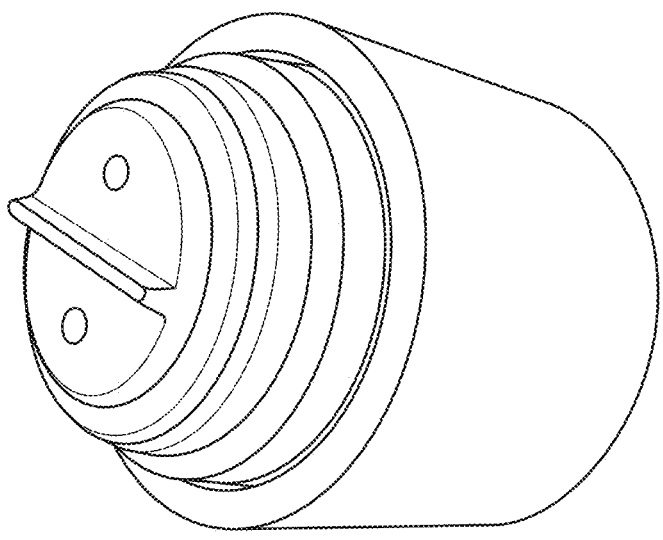
FIG. 4 illustrates a picture of a porous forming mold manufactured using the techniques described herein.

FIG. 4 illustrates a picture of a porous forming mold manufactured using the techniques described herein. The mold manufactured was a single zone mold in which the fill density and fill pattern was homogenous throughout the mold. The porous forming mold was printed in blue PLA and is shown attached to a forming machine base (colored red to distinguish it from the mold) to create a simple former. The forming machine base is non-porous and provides a substantially air-tight connection between a hose connected to a blower and the back side of the porous mold. Depending on the direction of airflow from the blower, this set up allows a suction to be drawn though the mold drawing fluid through the blue porous mold into the chamber formed by the forming machine base. Alternatively, forced air from the blower could be passed through the forming machine base to blow through the mold from the back of the mold to the fiber contact surface of the mold to clean the mold of any fouling.

The forming mold was printed on an Ultimaker® S5 3D printer using MatterHackers® brand PLA. The mold's model was created using Solidworks® modeling software and shaped to create a simple molded fiber bowl having several intermediate side steps, a pair of dimples and a central trough. The mold model sliced using Cura slicing software from Ultimaker® with the following slicer program settings:

First Layer Height: 0.2 mm

Layer Height: 0.1 mm

Vertical Shell (Number of Perimeters): 0

Horizontal Shells: (Number of layers): 0

Fill Density: 70%

Fill Pattern: gyroid

Figure 5:
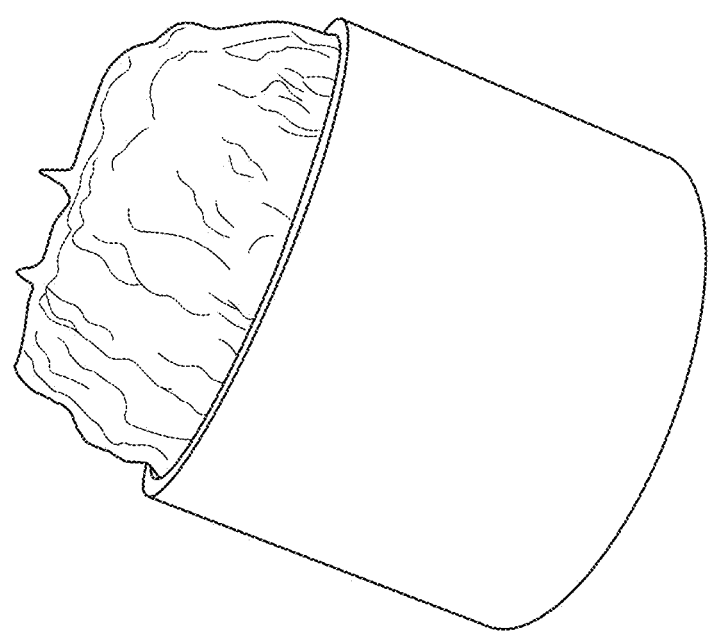
FIG. 5 illustrates the same forming mold and forming machine as shown in FIG. 4 after it had been inserted into a fiber slurry bath for approximately 4 seconds.

FIG. 5 illustrates the same forming mold and forming machine as shown in FIG. 4 after it had been inserted into a fiber slurry bath for approximately 1-4 seconds when subjected to a pressure differential by attaching the back side of the forming mold (i.e., the side opposite the fiber contact surface of the mold) to a source of suction, in this case the inlet of a blower.

This experiment successfully created a wet part on the surface of the mold. As can be seen from FIG. 5, none of the surface of the mold is visible, rather the entire exposed surface of the mold is covered with a fiber layer of slurry (white material). Upon inspection, the thickness of the fiber layer created was found to range from 1 mm to 2 mm.

Figure 6B:
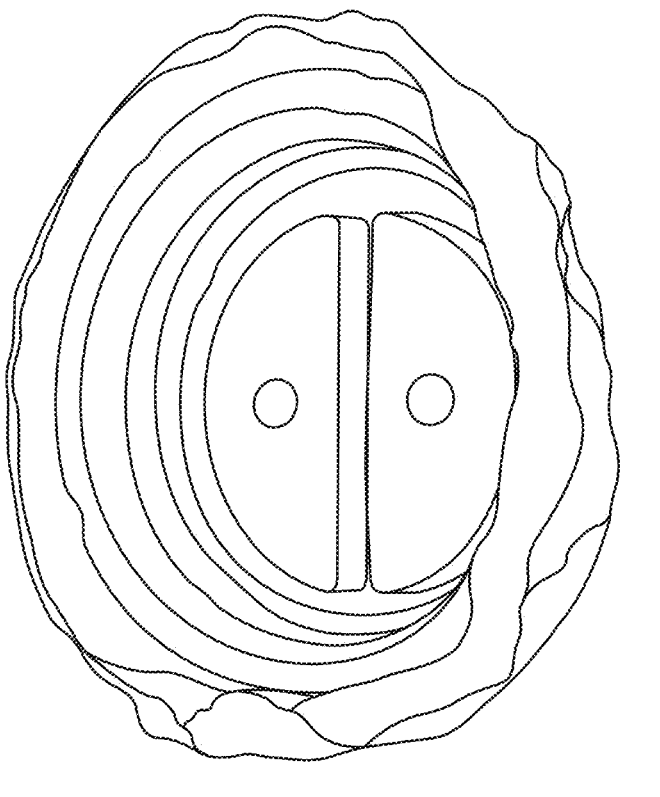
FIGS. 6A and 6B are photographs of different views of the same wet part created by the experiment showing molded side of the part.
Figure 6A:
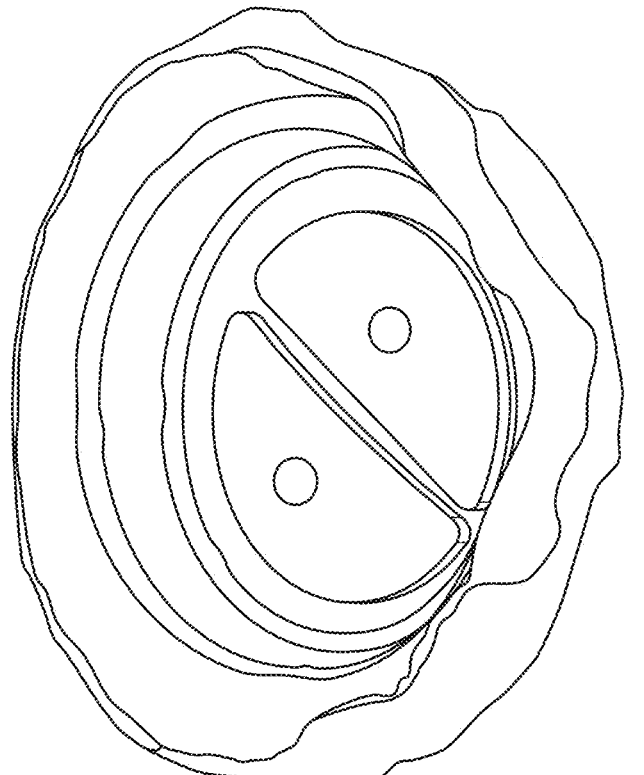

FIGS. 6A and 6B are photographs of different views of the same wet part created by the experiment showing molded side of the part. This experiment showed that an effective porous mold can be created easily and simply using standard additive manufacturing technology by adjusting commonly used print parameters.

The porous molds described above are simple, single piece molds made using uniform print parameters through-out the mold that can be printed using a single mold model. More complex porous mold designs are also possible.

Multi-Part Molds

Figure 8:
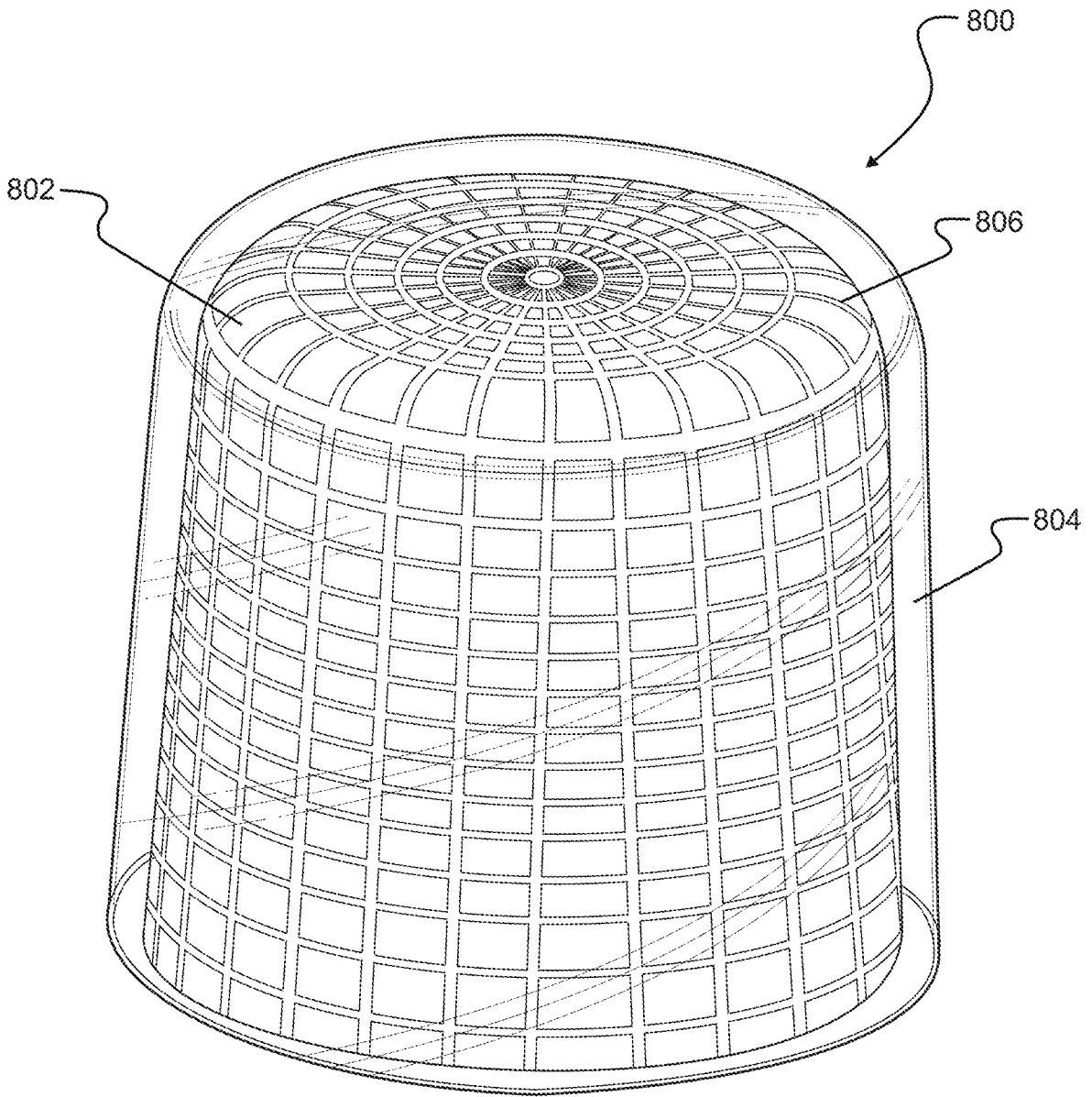
FIG. 8 illustrates a two-part porous mold design suitable for being made using additive manufacturing consisting of a mold core and mold screen.

FIG. 8 illustrates a two-part porous mold design suitable for being made using additive manufacturing consisting of a mold core 802 and mold screen 804. In the embodiment shown, the mold core 802 and mold screen 804 are modelled and printed as a separate components. The mold screen 804 provides the fiber contact surface and the mold core 802 may provide the attachment surface(s) for attaching the mold 800 to the processing machine and connecting it to the vacuum system. Attachment surfaces may be provided to either or both of the core 802 and screen 804 components for engaging with and attaching to the other component.

The mold core 802 may be porous or may be non-porous. As shown, the mold core 802 may be provided with fluid flow channels 806 on one or more of its surfaces as shown. Additional fluid flow channels may be provided through the mold core 802, as well other functional connections such as electrical conducting components or heat transfer channels as described above.

The mold screen 804, on the other hand, is a porous component modeled and sliced as described above with reference to FIGS. 1-5. The mold screen 804 is porous, its porosity a result of the print parameters selected during the slicing of the mold screen model. One surface of the mold screen is shaped as the negative of a portion of a molded fiber part to be made. Another surface of the mold screen 804 is shaped to engage with the mold core 802 while allowing fluid flow from the channels of the mold core 802 (and the pores of the mold core 802 if it is a porous mold core 802) through the porous screen 804.

When assembled, the mold core 802 and mold screen 804 create a mold assembly 800 with a porous exterior for use in manufacturing molded fiber parts. The two-part mold 800 allows either component to be replaced in case of failure, fouling, or change in design of the part or the processing machine.

In alternative embodiments, multiple-part molds may be designed and used for complex molds or molds with differ-ent usability requirements. For example, molds with multiple, nested mold screen components may be used for very fine fiber slurries in which the fiber contacting mold screen is thin but has a relatively smaller average pore size. Essentially acting as a very fine screen created by additive manufacturing, the screen can be easily removed, replaced and recycled as needed.

Likewise, multi-part mold cores may be designed and used for complex molds.

Regardless of the number of components, each mold component can be made using an embodiment of the method 700 described above. In addition, the porosity and pore size of each component may be tailored to meet desired attributes and performance for the mold assembly.

Combination 3D-Printed and Vacuum Formed Molds

Similar to the multi-part mold designs discussed above, another embodiment of a mold for use in molded fiber manufacturing can be made using a combination of additive manufacturing and vacuum forming. In an embodiment, the core of the mold may be made using additive manufacturing as described above. After the core is made, a sheet of vacuum formable material having the appropriate screen properties is then vacuum formed onto the mold core, thus creating a final mold. Because of the porosity of the mold core, it already has the necessary properties to act as a vacuum forming mold. However, in this application, the vacuum formed component may be designed to be perma-nently or semi-permanently (e.g., the only way to remove the vacuum-formed screen may be to destroy it, but this does allow the core to be reused) fixed to the core. In some applications, the vacuum forming may allow for finer screens to be made or screens to be made that can achieve parameters difficult to create via current additive manufac-turing techniques.

Multi-Zone Unitary Molds

Multi-zone molds are printed as unitary pieces, but the print parameters and/or materials within the mold are varied between different portions of the mold. For example, the print parameters of the center, or core, of the mold may set to a first set of print parameters and the nearer to the contact surface with the fiber, a second, different set of print param-eters may be used. Depending on the slicer software used, this may be achieved by designating different portions of the mold as different "bodies" to be treated differently with their own print parameters by the printer. When designating different bodies within the model, the slicer software typi-cally allows all of the print parameters to be set differently for each designated body.

Figure 11:
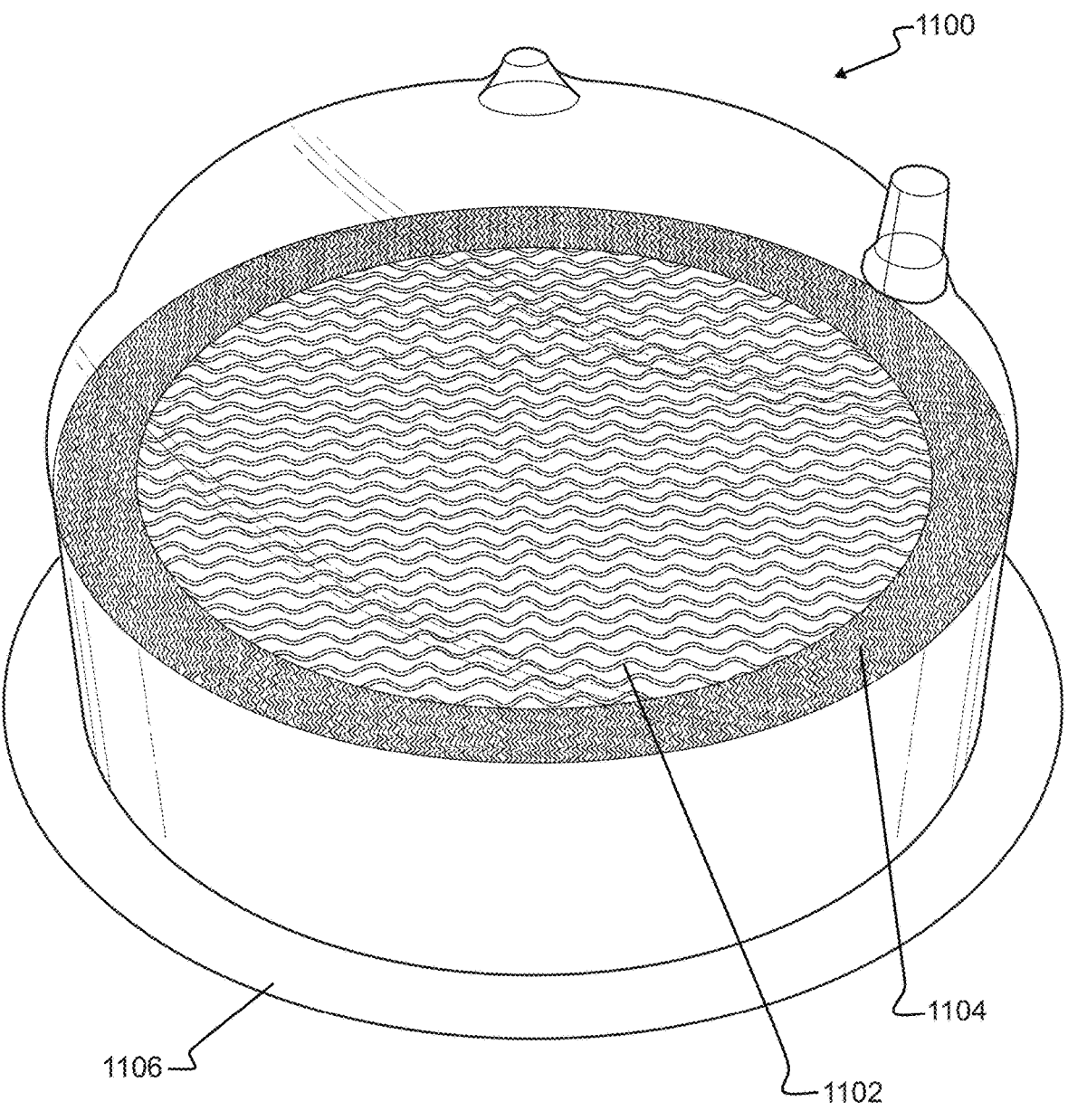
FIG. 11 illustrates an embodiment of a multi-zone porous mold.

FIG. 11 illustrates an embodiment of a multi-zone porous mold. In the FIG., the core region 1102 is designated as a first body, and the outer portion 1104 of the mold 1100 is designated as a second body allowing the slicer software to treat both bodies differently. The core region 1102 in the embodiment shown is assigned an infill density of 20% and a fill pattern of gyroid. The outer portion 1104 of the mold 100 is assigned an infill density of 70%, but still using the gyroid pattern. No surface layers are provided between the two bodies 1102, 1104 by setting the surface layer thickness to zero layers for both bodies. This causes the printer to connect the two infill patterns together without a hard, continuous and non-porous surface between them.

FIG. 11 also shows a mold attachment surface in the form of a flange 1106 at the base of the mold 1100.

For porous molds for molded fiber part manufacture, the multi-zone unitary mold technique effectively allows the outer surface body of the mold to be printed having an integrated screen in the form of the outer surface body around a more porous central core, as shown.

Figure 12:
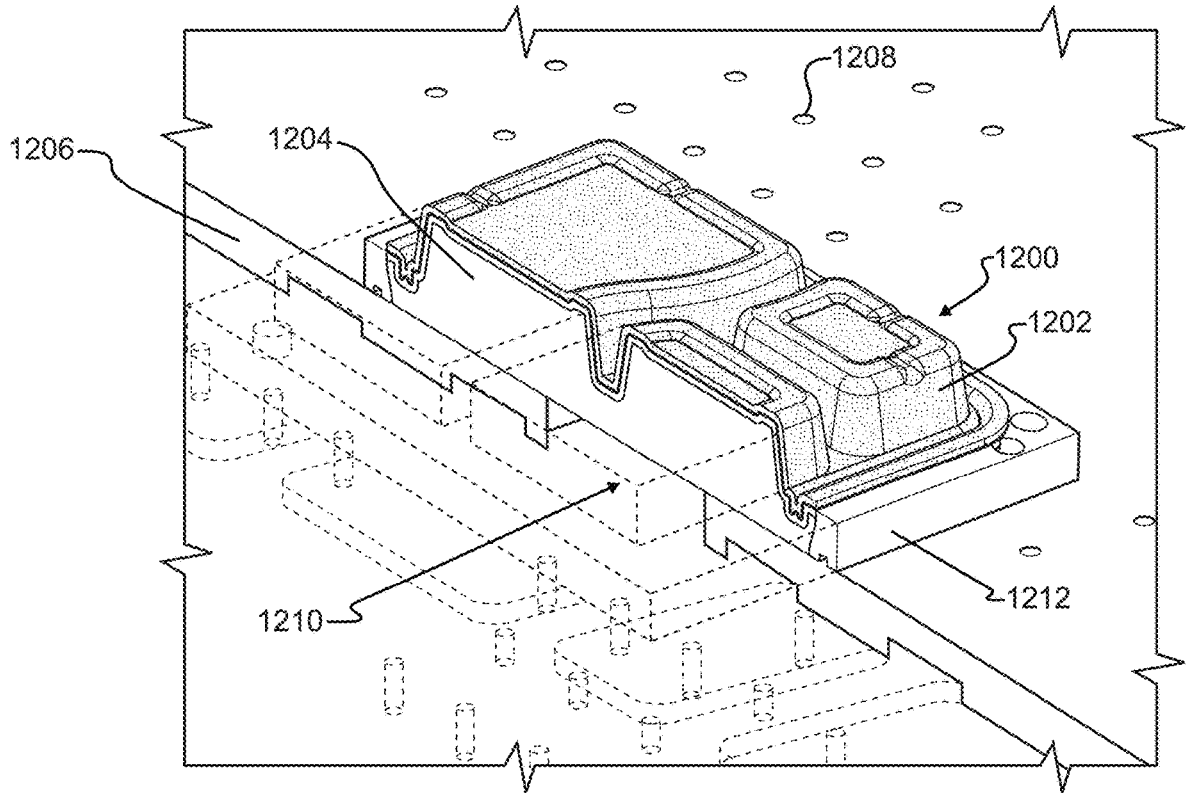
FIG. 12 illustrates another embodiment of a multi-zone mold of a more complex design assembled on a platen of a process machine.

FIG. 12 illustrates another embodiment of a multi-zone mold of a more complex design assembled on a platen of a process machine. The mold 1200 is for a three-compartment molded fiber tray. As indicated in the FIG., the outer portion 1202 is provided with a more dense infill pattern creating small pores in the surface and, effectively, forms an outer screen of lower porosity and/or lower pore sizes. The inner core portions 1204 of the mold 1200 is printed with a lower fill density thereby decreasing the resistance to fluid flow through this region and distributing the pressure differential more evenly across the outer surface portion 1202 of the mold 1200.

FIG. 12 further illustrates the platen 1206 of the process machine. The platen is essentially a plate with a number of mounting holes 1208. The platen is also provided with an aperture 1210 that acts as a suction port through which the mold core 1104 is in fluid communication with the pump system so that a differential pressure can be created across the mold, thereby drawing the water through the mold 1200 and depositing a layer of fiber on the fiber contact surface of the screen 1202. A solid frame 1212 may be provided around the perimeter of the mold 1200 as the attachment surface/flange for attaching the mold 1200 to the platen. In the embodiment shown, the screen 1202 is of uniform thickness and engages with the mold core 1204 along an interface surface on the mold core 1204.

Figure 13:
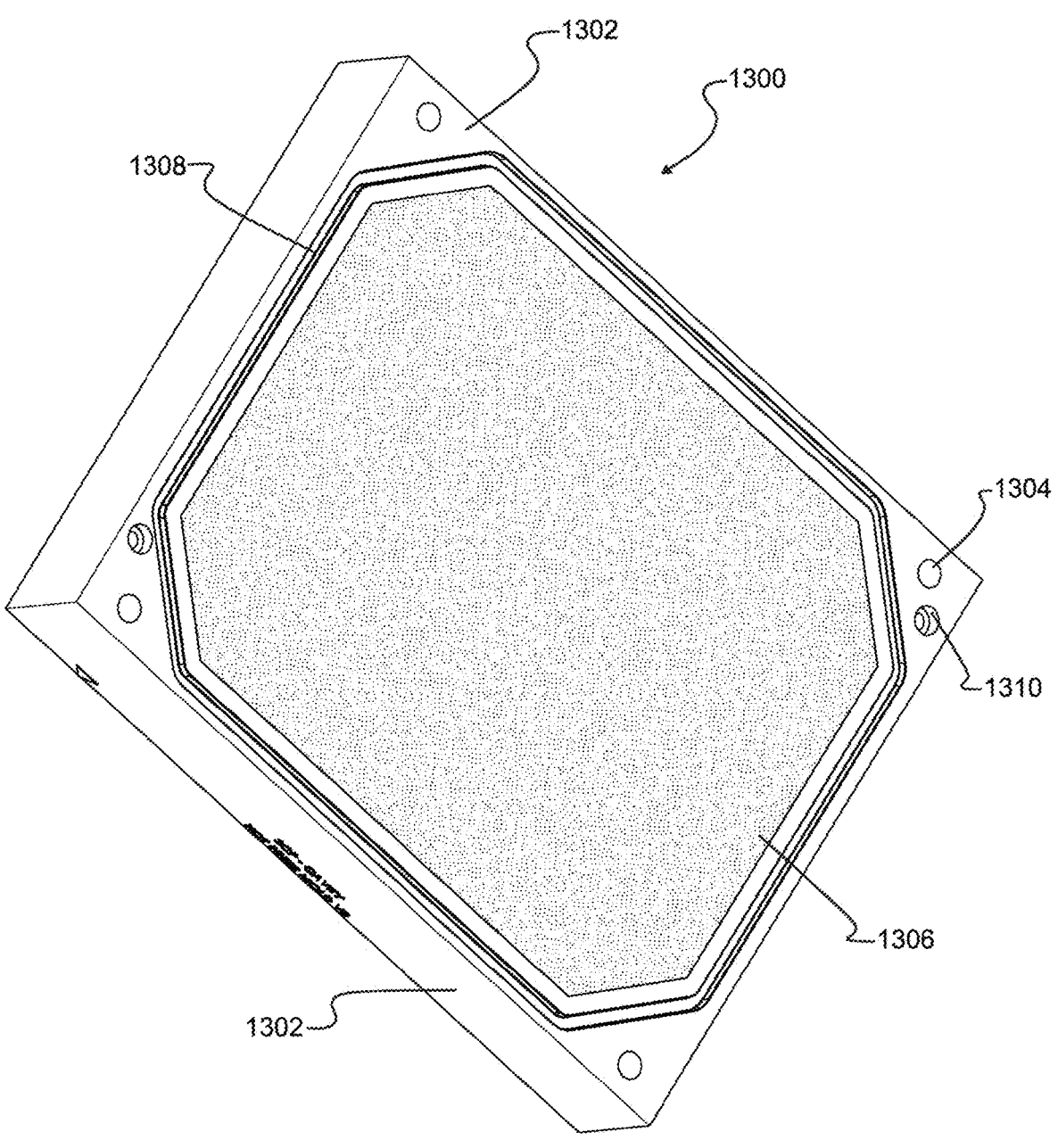
FIG. 13 illustrates a mold base.

FIG. 13 illustrates the underside of a mold core showing the base where the mold core is exposed to a suction port. The mold base 1300 could an integral part of a printed mold or could be a separate part allowing for the attachment of the mold to the platen. In the embodiment shown, the base 1300 includes an external frame 1302 that provides the points of attachment such as holes 1304 for attachment screws and guide slots 1310 for locating pegs. The center 1306 of the mold base 1300 is a porous structure with large voids for water extraction. A mold base O-ring 1308 is provided in a slot in the frame 1302 to seal the external environment from the vacuum suction in through the center 1306.

FIG. 19 is a picture of a multi-zone mold. A light source is on the opposite side of the mold so that light is shining through the porous mold, highlighting the fill pattern in both the core zone and the tighter fill pattern in the screen.

Variation of Mold Screen Print Parameters Based on Angle of Molded Product Contact Surface Another useful technique is to vary the infill parameter based on the angle of the porous contact surface of the mold screen. That is, the angle relative to the plane of printing, e.g., the plane in which the layers are laid down (referred to herein as the "print plane", which is generally the horizontal plane during the manufacturing process) of a surface dictates what print parameters are used for the section adjacent that surface.

As mentioned above, one drawback of using traditional slicer and additive manufacturing systems to create porous molds is their handling of the exterior surfaces which contact the molded fiber material. The porous fiber contact surfaces are created by setting the thickness of the exterior surface of the mold screen can be set to 0 thus exposing the infill pattern on the surface and creating a porous contact surface. The resulting porosity of the contact surface will be dependent on infill density, the infill pattern, layer height, extrusion diameter, selected material, as well as other settings but will be reproducible and controllable so that a desired porosity can be obtained through trial and error changing of the infill density and/or other print parameters.

However, it has been determined that the porosity of an exposed surface resulting from an exposed infill pattern will vary based on the angle of the contact surface relative to the print plane. For example, an infill pattern may have a certain porosity when exposed on a horizontal plane but a different surface porosity (that is, expose pores on the surface of different pore size relative to those on the other planes) when exposed on a vertical plane or a diagonal plane. Thus, on an additive manufacturing mold for making a bowl, for example, where the contact surface may transition between vertical and horizontal portions many times (see FIG. 4 for example), the actual porosity of the contact surface will vary across the surface depending on the angle of the surface. Although porosity as properly used is a property of three-dimensional volume of a material, as used herein the "porosity of the surface" or "surface porosity" refer to a measure of the ease at which water may flow into the body through the surface which corresponds more to the concept of average pore size (or mesh size as that term is used in the industry) of the pores which provide access from the exterior of the body through the surface and, in this case, into the interstices of the infill pattern of the body.

In order to obtain a contact surface with a more uniform surface porosity across the surface, the print parameters for different sections of a mold screen may be varied based on the angle of the contact surface. In this technique, one or more print parameters, such as the infill density or infill pattern for a layer or set of layers, are varied based on the angle of the contact surface of that layer. In experiments, it has been determined that a lower the infill density for more vertical contact surfaces increases the uniformity of the porosity of the contact surface of the mold screen. In this embodiment, sets of layers are determined based on the range of angles of the contact surface relative to some reference plane, such as the print plane, and the print parameters are chosen to achieve a target porosity of the contact surface.

For example, in a simple embodiment, regions of the mold screen that have contact angles roughly horizontal (i.e., less than or equal to ±15 degrees, ±30 degrees, ±45 degrees or even ±60 degrees off the horizontal) may be printed with a first setting for the infill density, such as 65%, whereas regions of the mold screen that have contact angles greater than the roughly horizontal are provided with a second infill density setting such as 60%. This simple embodiment separates the mold screen into two bodies based on the angle of the contact surface and varies the infill density for those two bodies. By changing the infill density based on the angle of the contact surface, the porosity of the surface can be controlled in order to achieve a more uniform porosity across the entire contact surface.

More complex embodiments are also possible, such as more finely separating the mold screen into three or more bodies in which each body has a different range of angles of the contact surface. For example, using one infill setting for layers where the contact surface has angles from 0-±30 degrees of horizontal, a second infill setting for greater than ±30 degrees but less than ±60 degrees, and a third infill setting for layers from ±60-90 degrees of horizontal.

In another more complex embodiment, multiple print parameters may be altered based on the range of angles of the contact surface relative to the reference plane. For example, the infill density and the infill pattern may be changed for different sets of layers have different angles of the contact surface of the mold.

The technique may be implemented by dividing the mold screen into different bodies based on the angle of the contact surface. Thus, a porous mold may have one body for the mold core and then two or more bodies for the mold screen, each body created using a different set of print parameters.

Variation of Mold Core Print Parameters Based on Angle of Interface with the Mold Screen The primary purpose of the porous mold core is to physically support the mold screen and prevent it from collapsing or deforming during the molding operation while also providing a uniform pressure differential over the mold screen. In opposite to the issues faced when printing the mold screen, it has been determined that different interface angles between the mold screen and the mold core provide different amounts of physical support when the interface thickness is set to 0. For example, horizontal interfaces typically offer less support to the mold screen, while more vertical interfaces provide substantially more support. The pressure applied to the mold screen, of course, is then limited to the weakest point on the screen. Thus, it is preferable to eliminate weak spots as much as possible.

Similar to the mold screen, it has been determined experimentally that this drawback can be handled by varying one or more print parameters of the mold core based on the angle of the interface between the mold core and the mold screen relative to the print plane. In particular, increasing the infill density of the layers of the mold core that have more horizontal interface angles relative to the layers with more vertical angles, makes the physical support of the mold screen more uniform. Again, the amount of support provided by the mold core will be dependent on infill density, the infill pattern, layer height, extrusion diameter, selected material, as well as other settings but will be reproducible and controllable so that a desired porosity can be obtained through trial and error. However, by changing the infill density based on the angle of the interface between the mold core and the mold screen, the physical support of the mold screen can be controlled in order to achieve a more uniform strength across the entire core screen.

Figure 20:
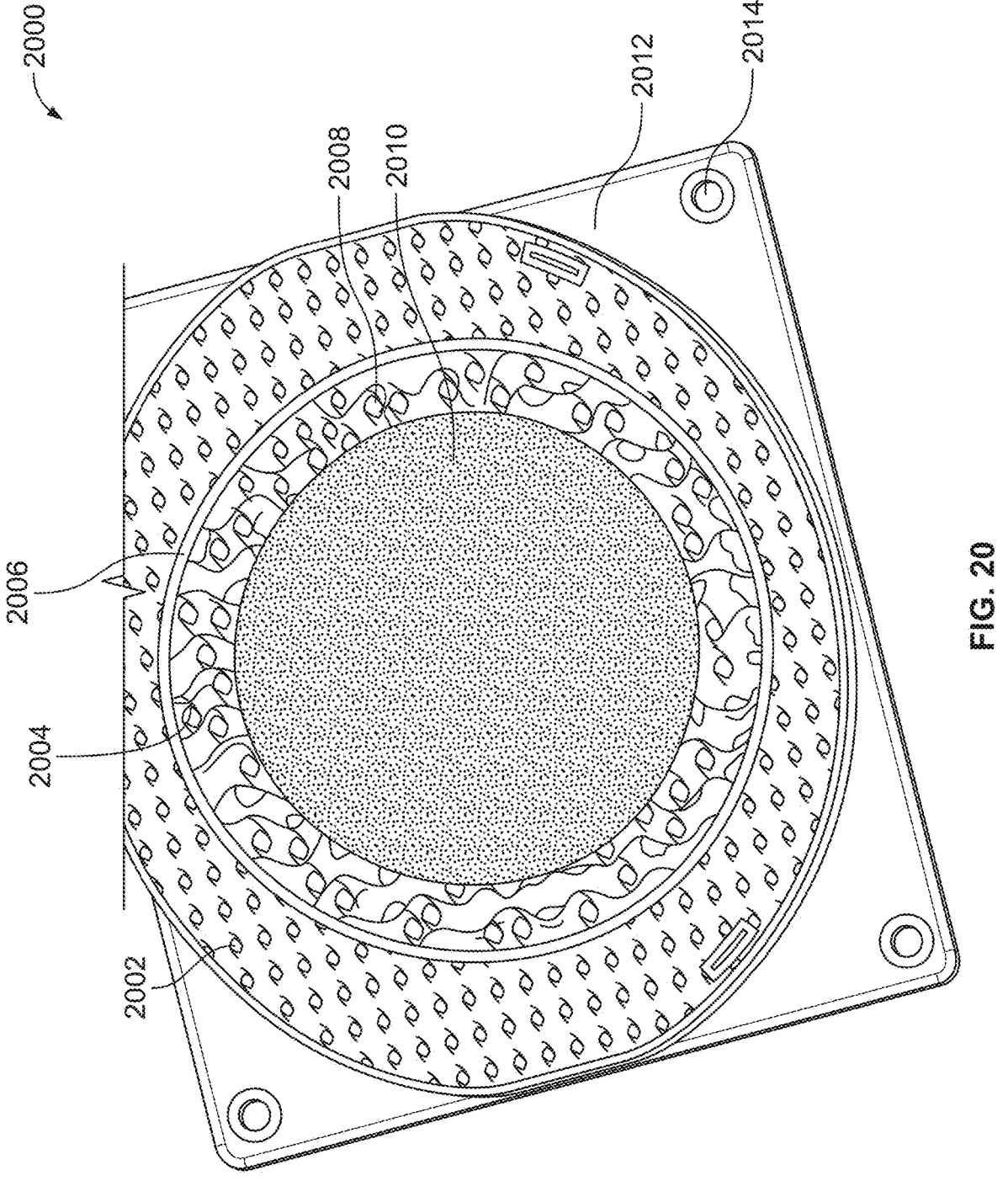
FIG. 20 illustrates a sectional view of an embodiment of an additive manufacturing mold for forming a molded fiber mask using a denser infill for horizontal interface surfaces.

FIG. 20 illustrates a sectional view of an embodiment of an additive manufacturing mold for forming a molded fiber mask using a denser infill for horizontal interface surfaces as described above. In the embodiment shown, the mold 2000 includes a non-porous frame 2002 separated from the porous mold core 2004 by a solid wall 2006. The frame 2002 is referred to as a non-porous because it is surrounded by a non-porous wall 2006 so that, even though the center of the frame is not 100% solid, nothing can flow into or out of the frame 2002. The cutaway view shows the body 2008 of the mold core 2004 with its normal infill density which is used for non-horizontal interface surfaces and the volume of the core proper. FIG. 20 also shows the horizontal interface portion 2010 of the mold core 2004 that has a denser infill pattern than that in the mold core body 2008. In the embodiment shown, the pattern is the same, but the infill densities differ. In an alternative embodiment, a different infill pattern and density may be used for the horizontal interface portion of the core.

FIG. 20 also illustrates the molded fiber processing machine attachment portion 2012 of the mold 2000. In the embodiment shown, the molded fiber processing machine attachment portion 2012 is integrated into the frame and includes a flange that has attachment holes 2014 for attaching to a platen.

Again, more complex embodiments are also possible, such as more finely separating the mold core into three or more bodies in which each body has a different range of angles of the interface surface with the mold screen. For example, using one infill setting for layers where the interface has angles from 0-30 degrees of horizontal, a second infill setting for greater than 30 degrees but less than 60 degrees, and a third infill setting for layers from 60-90 degrees of horizontal.

In another more complex embodiment, multiple print parameters may be altered based on the range of angles of the interface. For example, the infill density and the infill pattern may be changed for different sets of layers have different angles of the interface between the mold core and mold screen. (Note that when the mold screen is a uniform thickness, the interface between the mold screen and the mold core will typically have an angle that is the same as the angle of the closest molded part contact surface of the mold. Thus, there will be very close correspondence between the angle of the interface and that angle of the contract surface.)

The technique may be implemented by dividing the mold core into different bodies based on the angle of the interface with the mold screen. Thus, a porous mold may have two or more bodies for the mold core and then two or more bodies for the mold screen, each body created using a different set of print parameters.

Mirroring of Molds to Reduce Anisotropies in Porosity

It has been further determined that another aspect of additive manufacturing infill patterns is that few patterns provide symmetrically porous surfaces when exposed along different planes. That is, the porosity of a contact surface that is a 60 degree-from-vertical diagonal plane cutting through a particular additive manufacturing infill pattern may be different than that of contact surface that is a 60 degree-from-vertical diagonal plane cutting through the same printed infill pattern in a different location. This anisotropy in porosity of contact surfaces means that, for molds for symmetrical parts, one side of the part may have a different porosity than its opposite side. The difference in porosity results in a different amount of fiber being deposited on the two sides given the same pressure difference during the forming process which causes different thicknesses of molded fiber to form and can reduce the quality of the finished part.

To prevent this anisotropy in porosity, the mold may be divided into two sections along a plane of symmetry and the mold then printed so that the pattern in each section is aligned in the opposite direction (i.e., one pattern is a reflection of the other. The term mirror image or mirror of the other may also be used). In yet another embodiment, there may be multiple planes of symmetry and the mold may be further divided into four or more sections and each section printed with the appropriately aligned infill pattern so that they are all reflections of each other.

Figure 21:
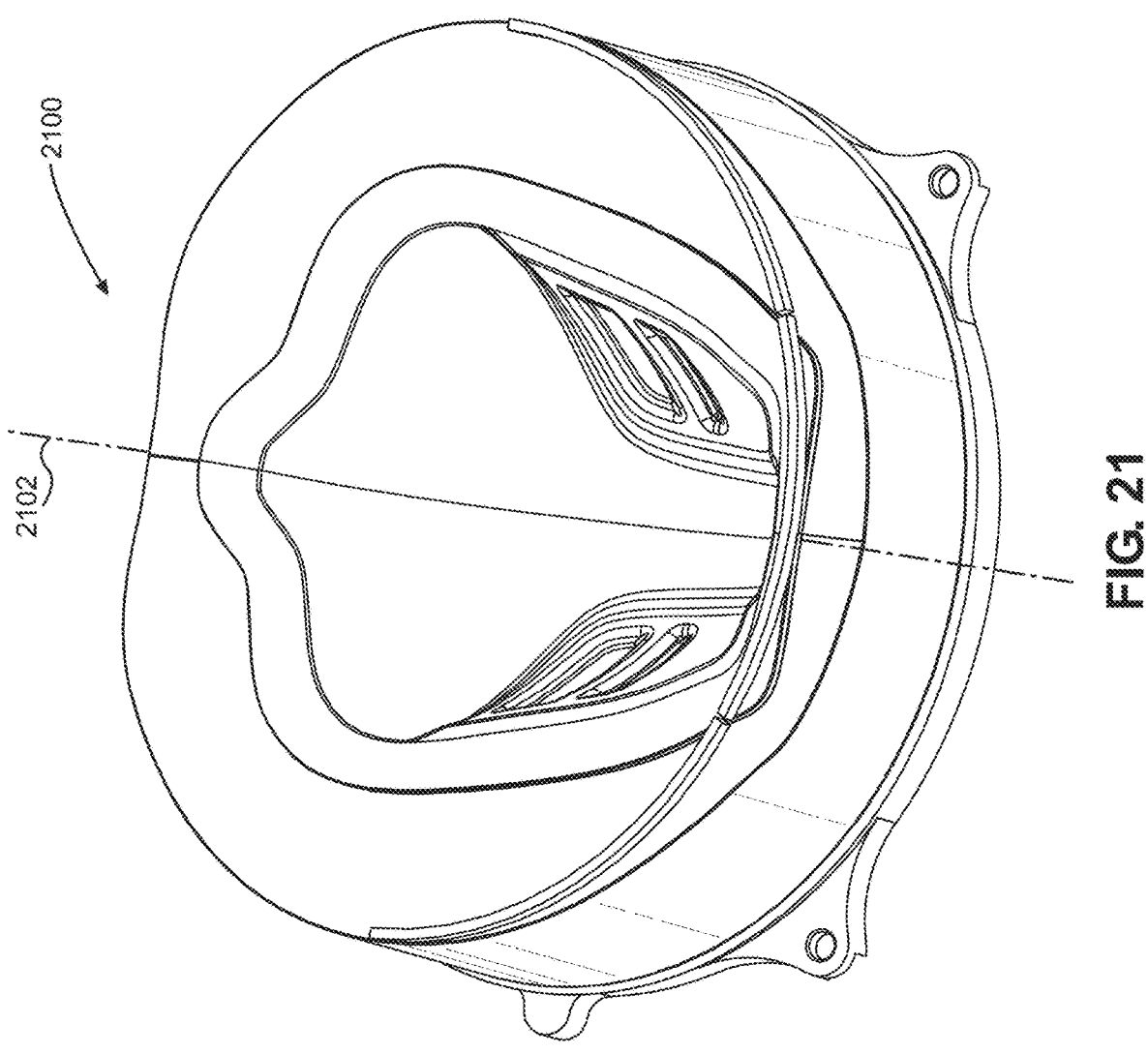
FIG. 21 illustrates an embodiment of an additive manufacturing mold for forming a molded fiber mask using a mirrored infill pattern.

FIG. 21 illustrates an embodiment of an additive manufacturing mold for forming a molded fiber mask using the mirrored infill pattern as described above. In the embodiment shown, a plane of symmetry exists 2102 through the nose and mouth portion of the mold 2102. In this embodiment, the right-hand section of the mold is printed with an infill pattern orientation that is the reflection (i.e., 180 degrees opposite) of the orientation used on the left-hand side of the mold. In an embodiment, all porous components of the mold, e.g., the mold screen and mold core, are printed with mirrored patterns along the plane of symmetry. In an alternative embodiment, only the mold screen is printed with mirrored patterns while the mold core is printed with a consistent pattern throughout the mold.

Increasing Slurry Velocity Through the Mold to Reduce Fouling

In order to prevent molds from becoming fouled with fiber, after each forming step a mold is backwashed by flowing pressurized air in a reverse direction through the mold. In addition, a mold may be periodically pressure washed with clean water to remove any fouling of the pores with fiber that cannot be removed by the routine backwashing with air. Reducing the amount of fouling that occurs has a drastic impact on the efficiency of a molding operation.

Counterintuitively, it has been determined that increasing the velocity of slurry water drawn through the mold screen and the mold in general reduces the fouling of that mold. Without being bound to any particular theory, it is believed the increased velocity may result in reduced penetration of fiber into the mold screen and better collection of fiber at the contact surface. For a given fiber molding system that has a fixed pump size and pressure differential, one method for increasing the velocity of slurry drawn through the mold screen is to reduce the overall resistance of the mold to water flow, thus increasing the velocity resulting from a given pressure differential across the mold. In an embodiment, this is achieved by reducing the volume of the porous mold core but drastically increasing the porosity of the mold core. These two changes result in an increased velocity of water flow through the different portions of the mold core (by reducing the volume of the core) and also increased the velocity of water flow through the mold screen (by reducing the overall flow resistance of the mold). In an embodiment, the volume of the mold core is reduced by redefining the mold core as that volume that is a fixed thickness, e.g., such as 1 cm, beneath the mold screen. The remaining volume of the mold that is not either porous mold core or porous mold screen, is the non-porous frame.

Figure 22:
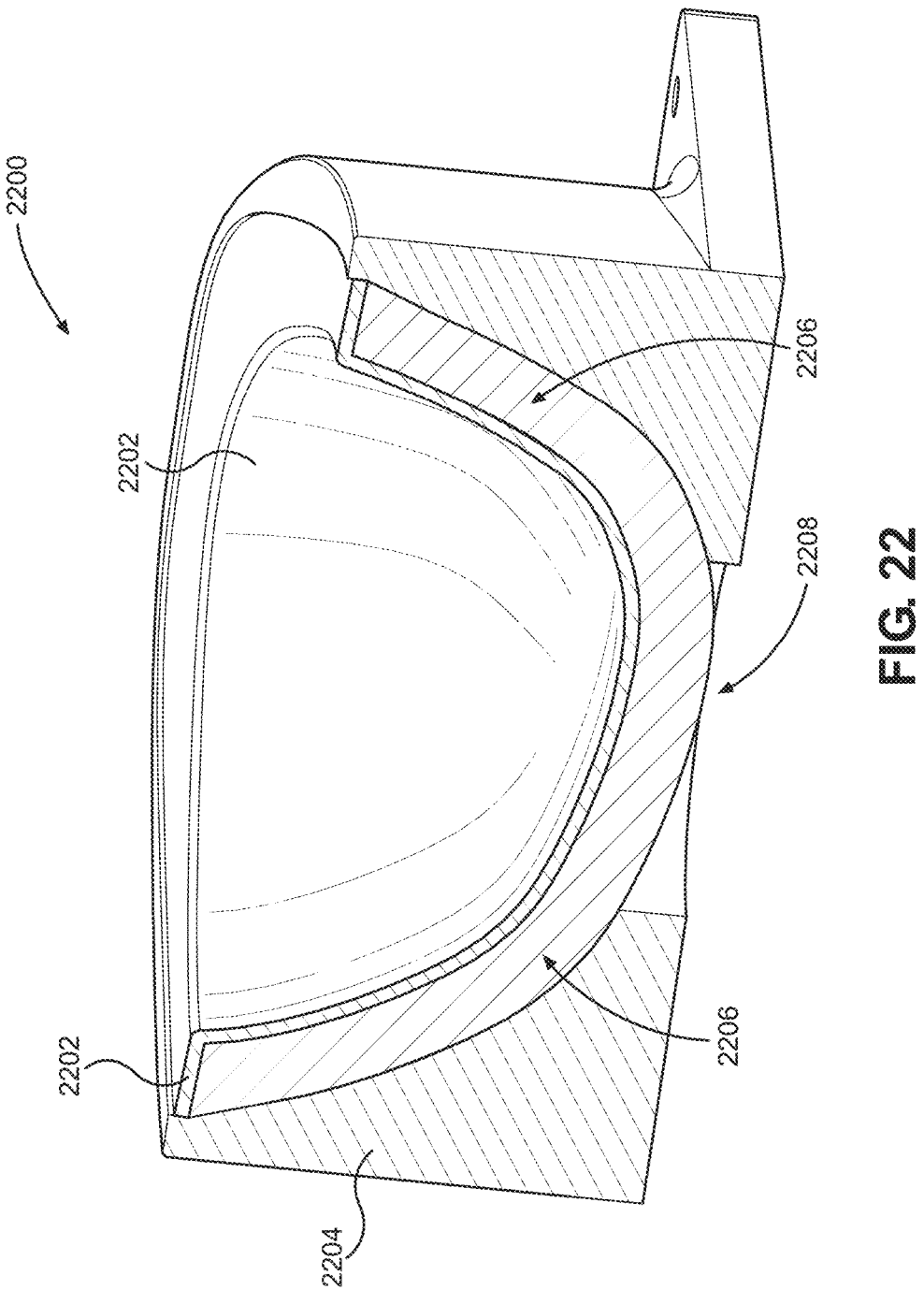
FIG. 22 illustrates a sectional view of an embodiment of an additive manufacturing mold for forming a molded fiber mask using a reduced volume mold core to increase the slurry velocity through the mold.

FIG. 22 illustrates a sectional view of an embodiment of an additive manufacturing mold for forming a molded fiber mask using the reduced volume mold core described above. In the embodiment shown, the mold screen 2202 is illustrated suspended from a non-porous mold frame 2204. A highly porous mold core 2206 is provided between the mold screen 2202 and the channel 2208 through which the vacuum is drawn. The mold core 2206 is a fixed thickness between the frame 2206 and the screen 2202 and its porosity is increased to maximum extent possible while still providing sufficient strength to support the mold screen so that it isn't damaged during the forming process. In an embodiment, the mold core 2206 may have a thickness of from 0.5-1.5 cm and an infill density as low as 5% but may range from 5-25% to support a mold screen that has a thickness of 0.1-0.5 cm and an infill density of 60-65%.

Figure 23:
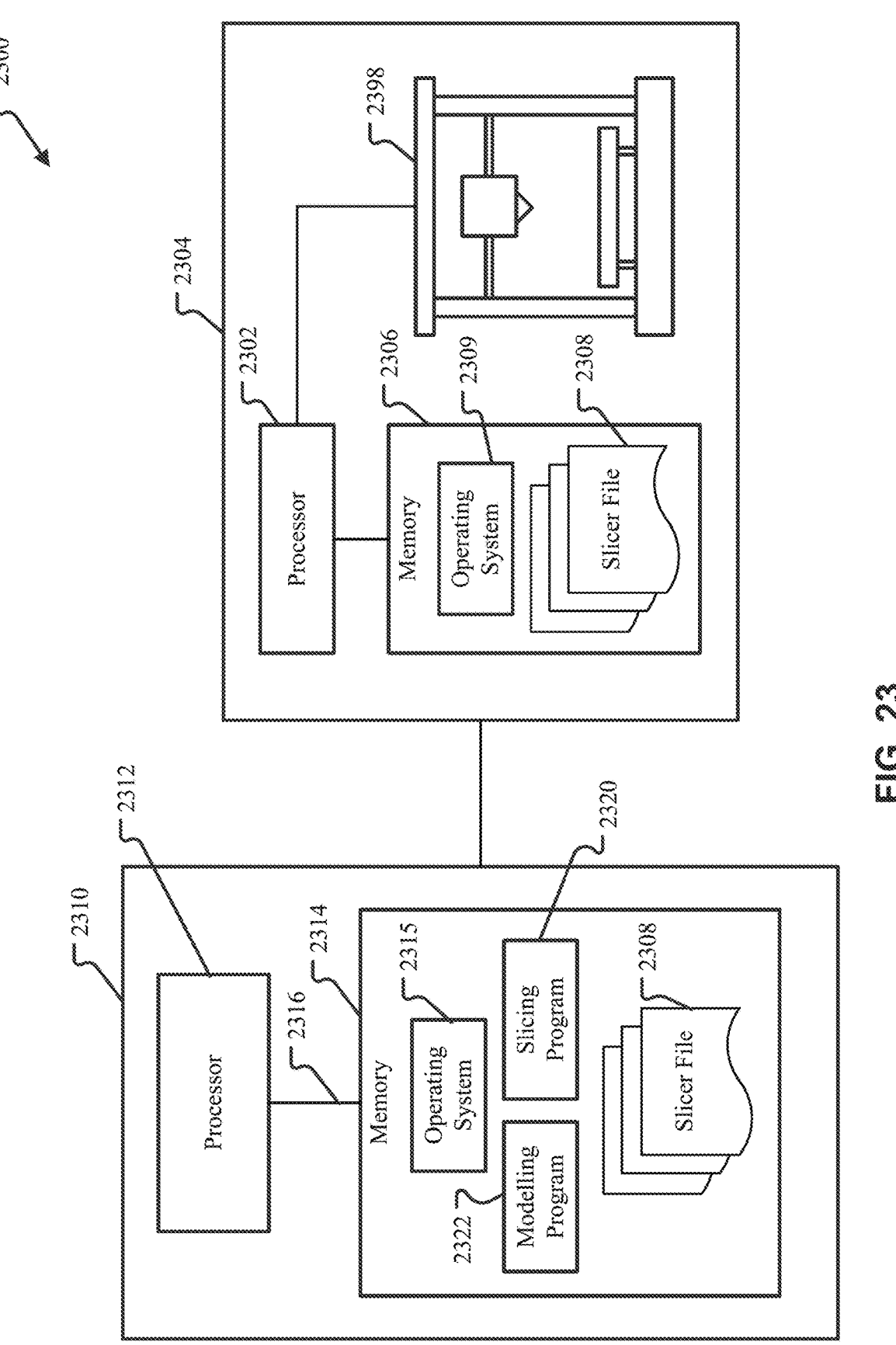
FIG. 23 illustrates a block diagram of components of an embodiment of a representative additive manufacturing system.

FIG. 23 illustrates a block diagram of the components of an embodiment of an additive manufacturing system 2300. In the embodiment shown, an additive manufacturing device 2304 includes the printer 2398 (that is, the hardware that does the actual printing, e.g., the gantry, extruder, nozzle, stepping motors, print bed, heaters, fans, power supply, etc.) which are controlled by an integrated control processor 2302. The additive manufacturing device 2304 may be any device that utilizes any of the additive manufacturing technologies described above including, for example, a 3D filament extruder/printer, a powder bed printer, photopolymer resin printer, a laser sintering printer, a 3D jet printer, a binder jetting printer, and a plasma deposition printer.

The control processor 2302 may be incorporated into the additive manufacturing device 2304 as shown, or may be part of a separate control computer (not shown). The control processor 2302 is coupled to a memory 2306. The memory 2306 is a computer-readable medium that contains the instructions for printing a particular mold or mold component. For example, in an embodiment the instructions are contained with a slicer file 2308. The memory 2306 may include multiple slicer files 2308 as shown, each slicer file for a different mold or mold component. The instructions are executable or interpretable by the control processor 2302 using its operating system software 2309 and, when executed, cause the device 2304 to manufacture a mold or mold component consistent with the model from which the instructions were created.

The system 2300 may also include the computer 2310 on which the 3D models are created and which also create the slicer files 2308. In the embodiment shown, the computer 2310 is a standard purpose computing device and includes at least one processor 2312 of its own, as well as a system memory 2314, and a system bus 2316 that couples the system memory to the computer processor. The system memory 2314 includes random access memory ("RAM") and read-only memory ("ROM"). A basic input/output system and operating system 2315 containing the basic routines that help transfer information between elements within the computer 2310, such as during startup, is stored in the ROM. Other components, not shown but known in the art, may be used such as a mass storage device, such as a hard disk or solid-state disk. It should be appreciated by those skilled in the art that computer-readable data storage media can be any available non-transitory, physical device, or article of manufacture from which the central display station can read data and/or instructions.

In general, computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information.

The computer 2310 is coupled to the control processor 2302 of the additive manufacturing device 2304. In the embodiment shown, the slicer file 2308 is generated on the computer 2310 and then transferred to the memory 2306 of the additive manufacturing device 2304 for later execution by the control processor 2302. Other configurations of a system 2300 are also possible and known in the art.

As described above, the slicer file 2308 is generated on the computer 2310 using slicer software 2320 stored on the memory 2314 of the computer 2310. Once the model of the mold is created using the modeling software 2322, the model is sliced to create the slicer file 2308. The instructions in the slicer file 2308 are generated based on the print parameters selected by the user. In an embodiment, for example, the slicing software converts the model into a g-code format file, which is specific code containing exact instructions for the additive manufacturing device 2304.

Elimination of the Mold Core

In yet another embodiment, it has been determined that in some cases for some molded fiber products the mold core of the additive manufacturing mold may be eliminated completely. In this embodiment, the mold screen is suspended from and attached to the mold frame. The volume where the mold core would have been is left empty. In this embodiment, the mold screen has sufficient strength to withstand the forces applied to the screen during the forming and pressing process. Alternatively, the volume that would have been the mold core may be provided with one or more supports or a simple support structure to support different points of the mold screen. If supports are used, the supports may be porous or provided with a porous section where the support contacts the mold screen.

Sensor Integration

When building molded parts for either prototype or production runs, physical stresses are placed on different areas of the part. This could be temperature, pressure, stress, or 'other' types of stressful properties. Even just monitoring the number of parts which have been created by the mold can be difficult to calculate. Embedding a wireless sensor to monitor both normal and environmental effects will aid in our understanding of the stresses the mold and formed product are placed under. By collection of this information, improvements in both the mold and formed products can be achieved.

Molds may be further designed to include slots or other attachment point for the inclusion of one or more sensors, such as wireless sensors using Bluetooth Low Energy could be in process now are devices (not limited to BLE) which can harvest energy without the need for an electrical source such as a battery. This improvement in industry removes the limiting factor of a battery or direct electrical connection to an external power supply. In an embodiment, such wireless sensors may even be inserted during the printing process so that they become an irremovable part of the completed mold. For example, a slot or other space, either internal to the finish printed mold or having external access, may be included in the design specifically to accept and engage with a sensor such as a temperature, compression pressure, air pressure, humidity, electrical conductivity, pH, or any other sensor now known or later developed. Such sensor slots may be located anywhere within the mold or on its surface and may be in any number. Such sensors may be useful in charactering the operational performance of the system in real-time and in later analysis.

In addition to the actual sensing device, such embedded sensors may include a wireless microcontroller to collect sensor information and send to an endpoint via some type of wireless protocol. The sensor may also include some power source which could be a battery or a capacitor, an inductive charger allowing wireless power transfer to the device, or an energy scavenging device such as a thermoelectric cell or piezoelectric cell that scavenges electricity from the environment, or a combination of these. For example, a piezoelectric cell could scavenge electricity from the pressure a press mold is subjected to during a pressing operation. This scavenged energy could be sent to a small capacitor or battery which then powers the sensor unit whenever the press is active. Depending on how much energy is scavenged with each press and the energy demand of the sensor, the sensor could be provided with enough power to provide uninterrupted operation while the production line is in use. Such sensors could also automatically go into a dormant state to preserve energy when the press is not operating, returning to active operation when the press resumes operation.

Heating Element Integration

In addition to sensors, other components could be integrated into or provided for in the design of molds. For example, in a hot press it is beneficial to heat the molder fiber part as uniformly as possible. Currently, heating done by heating the back side of a milled metal mold and hoping that the temperature at the fiber contact surface on the other side of the metal mold is consistent during operation. Because of the length of heat conduction paths from the base of the mold to different locations on the fiber contact surface, precise temperature control is often difficult. This is especially problematic for large, molded fiber parts, that is, larger than cups and bowls such as trays and pars greater than 50 cm on any side.

Figure 14:
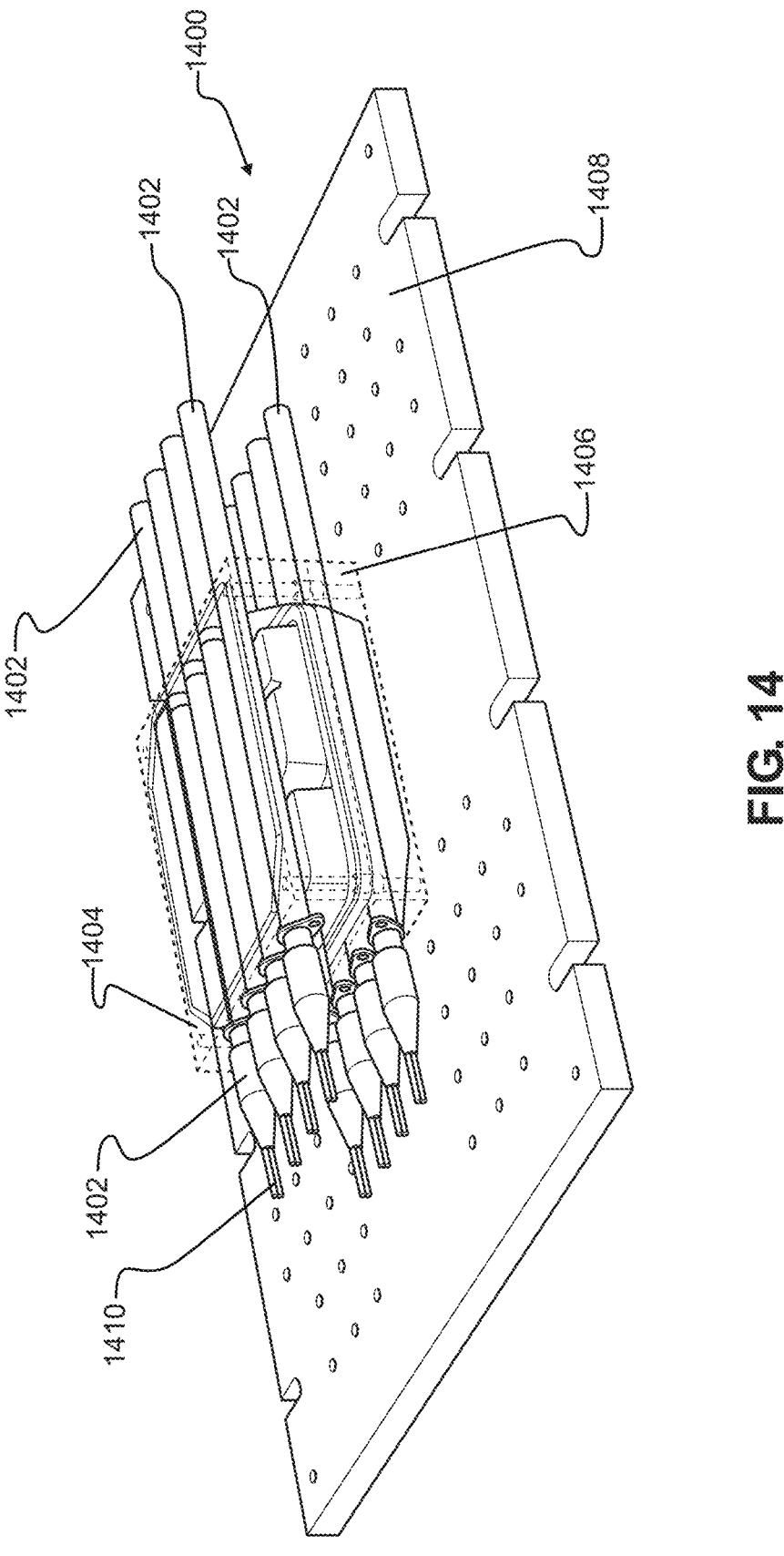
FIGS. 14 and 15 illustrate a pair of porous hot press molds provided with integrated holes penetrating the length of each mold for receiving a set of heating rods.
Figure 15:
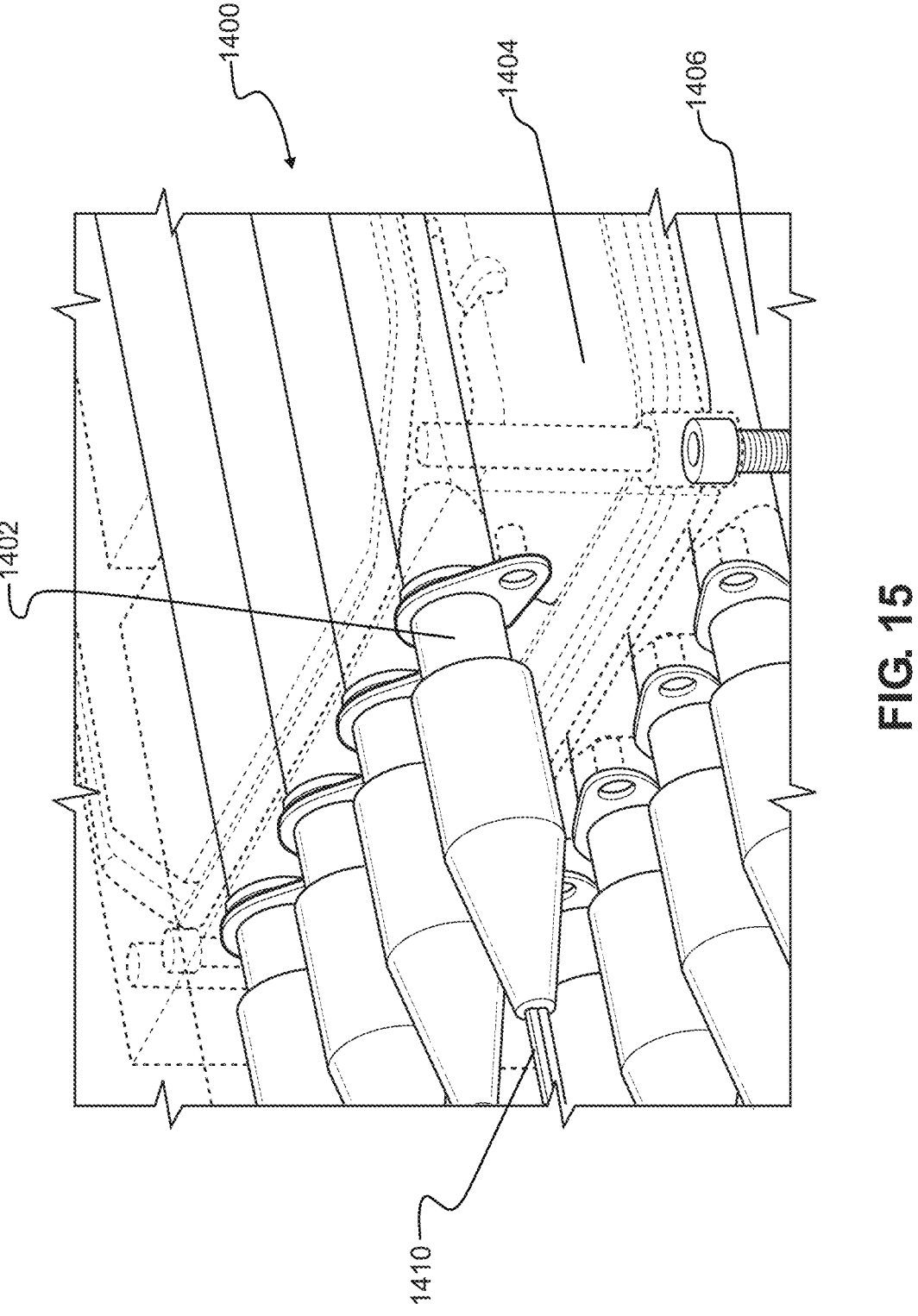

FIGS. 14 and 15 illustrate a pair of porous hot press molds provided with integrated holes penetrating the length of each mold for receiving a set of heating rods. The FIGS. illustrate a press 1400 with two molds in dashed lines: an upper mold 1404 and a lower mold 1406. In an embodiment shown the lower mold 1406 is created as described above and has a screen portion (not shown over a porous mold core which is shown attached to the platen 1408 of the press. The platen 1408 is provided with a suction port (not shown) for additional withdrawal of water or for retaining the part during the pressing operation. In an alternative embodiment, either or both molds may be solid or non-porous molds created in any manner.

The upper mold 1404 and lower mold 1406 are shown as transparent in order to illustrate the detail of the heating rods 1402 and the heating rod connections. Because the heating rods 1402 are closer to the molded fiber contact surface during the pressing operation, more precise control of the temperature that the molded fiber is subjected to can be maintained. In an embodiment, the heating rods 1402 are resistive heaters that are provided with electrical connections 1410 to a power source controlled by the manufacturing system.

In yet another embodiment, not shown, heating elements are integrated into a multi-zone mold in which a zone of different material is defined around the contact areas with the heating element. In this embodiment, the contact surfaces of the mold are printed out of a thermally conductive material while the structural zones within the mold may be printed from a different material. Any thermally conductive printing material such as copper or ice9™ Thermally Conductive Filament by TCPoly may be used. The contact surfaces may be the surfaces in contact with the heating element(s) and or the wet part.

In yet another embodiment, a thermally conductive (and porous core) may be created through which the heating elements are positioned. The core may be shaped so that when a uniform thickness screen component is added, the thermally conductive core is separated from the wet part by the screen. With the screen being a substantially same thickness everywhere, this results in the wet part being a fixed, equal distance between from the thermally conductive core everywhere along the part.

As used herein, two components may be referred to as being in "thermal communication" when energy in the form of heat may be transferred, directly or indirectly, between the two components. For example, a wall of container may be said to be in thermal communication with the material in contact with the wall. Likewise, two components may be referred to as in "fluid communication" if a fluid is transferred between the two components. For example, in a circuit where liquid is flowed from a compressor to an expander, the compressor and expander are in fluid communication. Thus, given a sealed container of heated liquid, the liquid may be considered to be in thermal communication (via the walls of the container) with the environment external to the container, but the liquid is not in fluid communication with the environment because the liquid is not free to flow into the environment.

Figure 16:
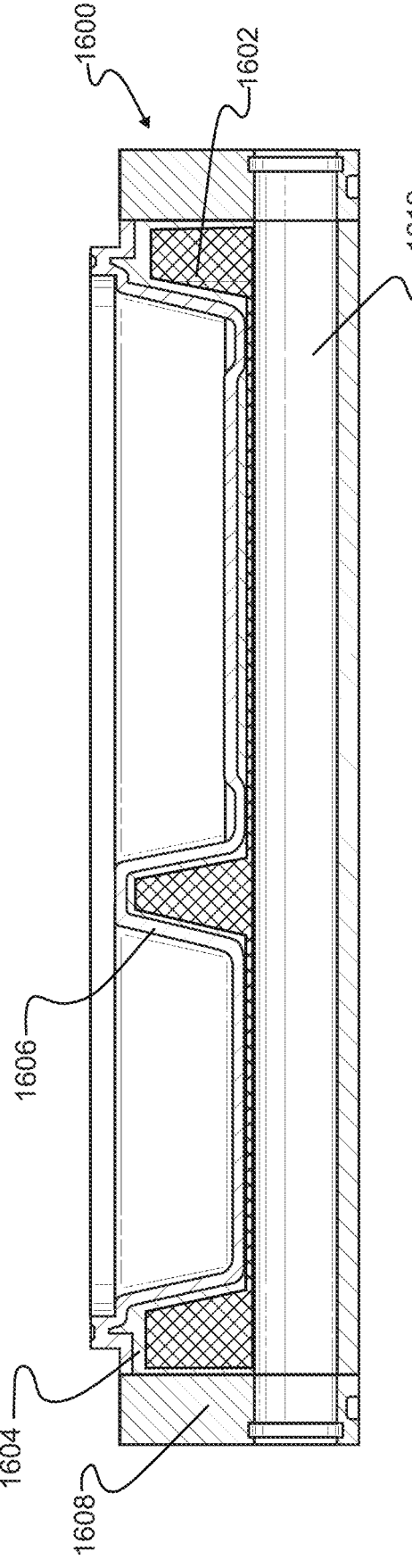
FIG. 16 illustrates a mold with more thermally conductive material used in specific portions of the mold to thermally connect heating elements to the screen of a mold, thereby more closely controlling the temperature of the screen and thus the temperature of the part during a pressing operation.

FIG. 16 illustrates another embodiment of the three-compartment tray mold design with incorporated heating elements. In the embodiment shown, the mold 1600 includes a thermally conductive central portion 1602 made of thermally conductive material and a porous structural core portion 1604 made of porous structural material (which or may not be the thermally conductive material, e.g., it may have a different infill pattern and infill density to provide structural strength but reduce the thermal conductivity of that portion of the mold 1600). A molded fiber contact screen 1606 is illustrated on the core 1604, which also forms the fiber contact surface of this mold 1600. Penetrations 1612 for heating elements can be seen at the sides of the mold. As discussed above, the thermally conductive material is positioned within the mold to increase the thermal connection between the screen and the heating elements. Similar to the screens described above, the structural core 1604 between the thermally conductive portion and the screen 1606 may be uniform or substantially uniform in thickness in order to maintain a uniform temperature at the surface contacting the part. A frame 1608 is also provided.

Figures 17A, 17B, 17C, 17D, 17E:
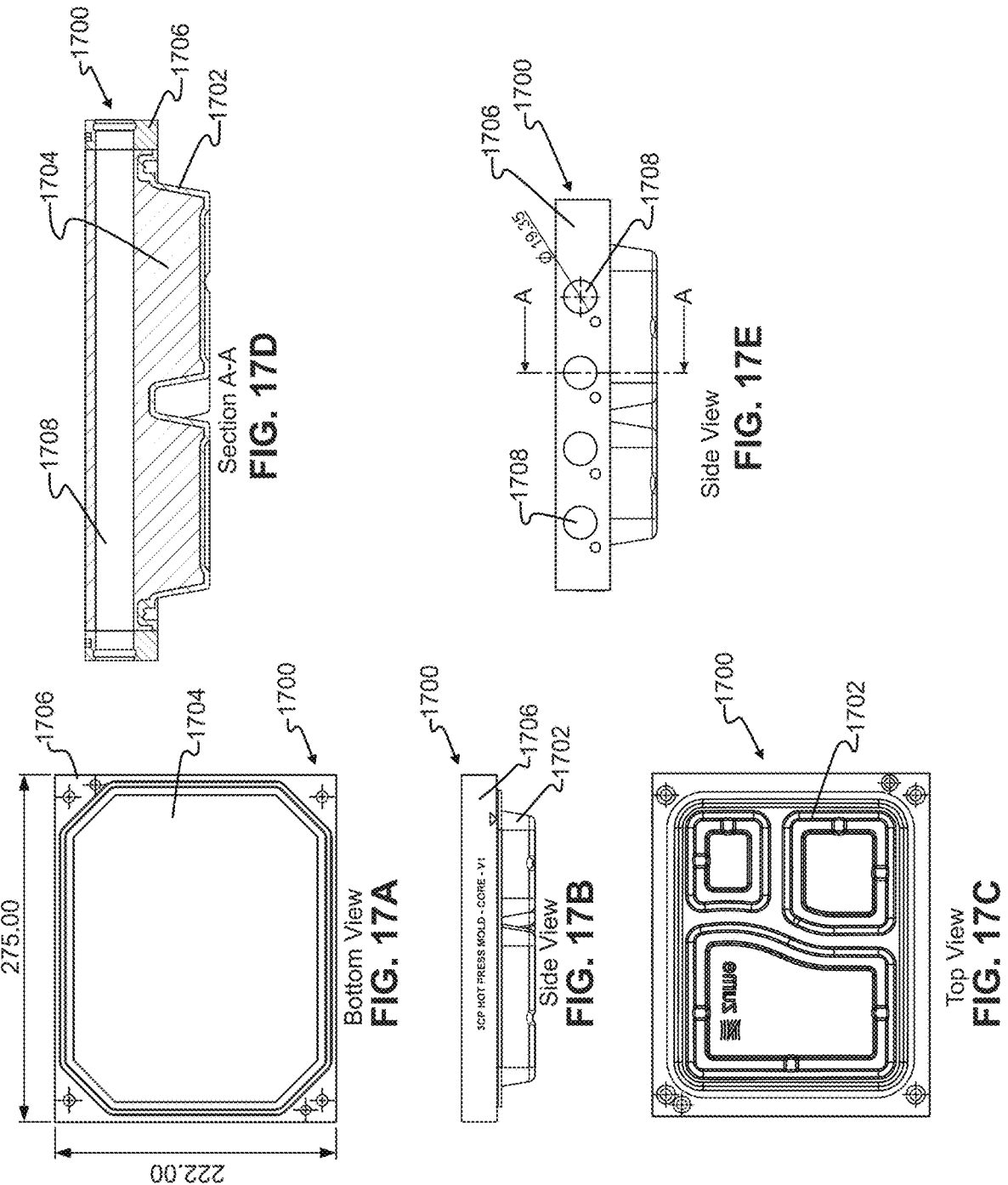
FIGS. 17A-17E illustrate different views of a multi-zone core-side mold with integrated penetrations for receiving heating elements for a three-compartment tray.

FIGS. 17A-17-E illustrate different views of a multi-zone core-side mold with integrated penetrations for receiving heating elements for a three-compartment tray. Here, the term "core-side" mold is used to refer to the mold that presses into a surrounding, or cavity, mold. The mold 1700 includes a screen 1702, a mold core 1704, a frame 1706, and a four apertures 1708 through the mold 1700 for receiving a heating element.

Figures 18A, 18B, 18C, 18D, 18E:
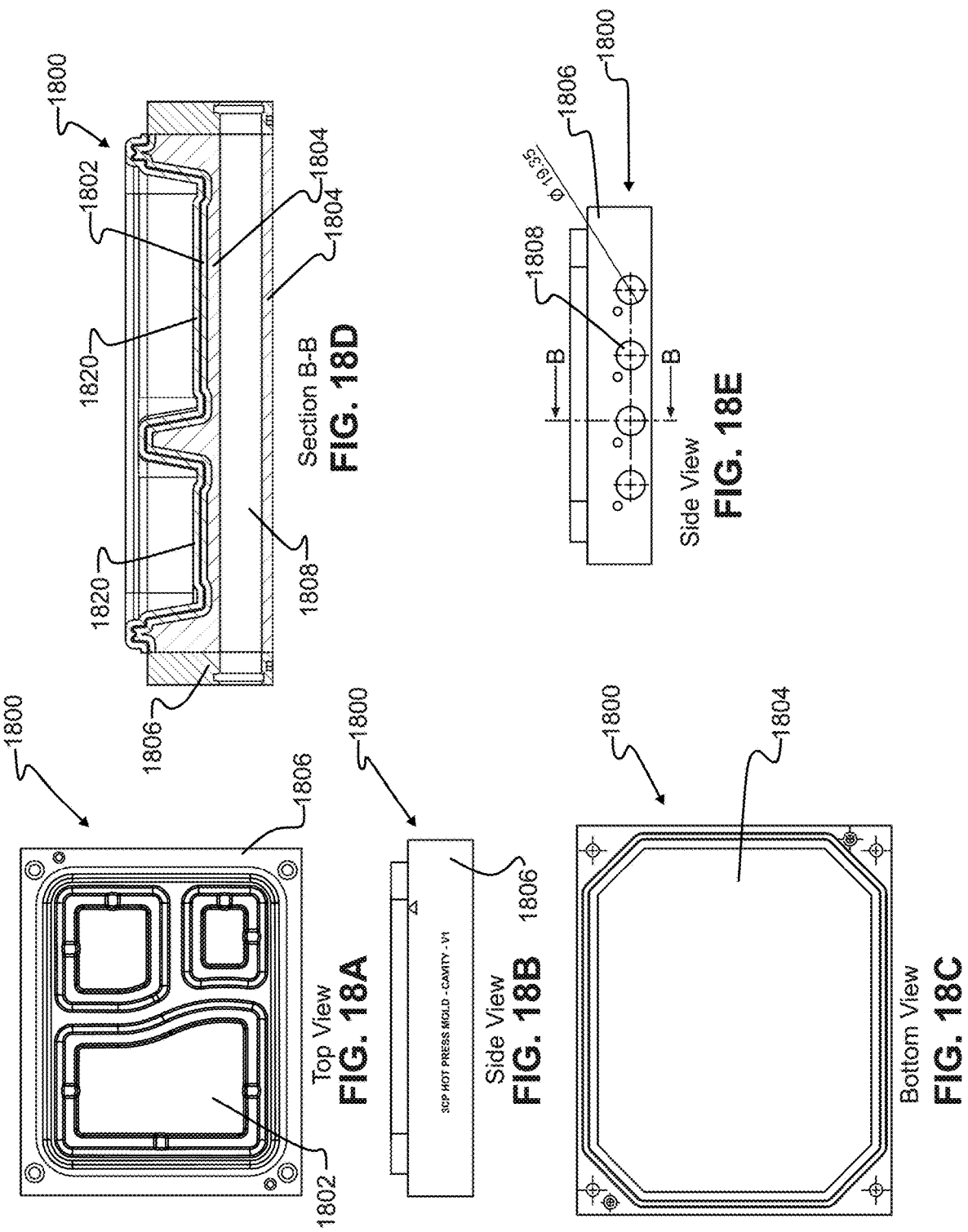
FIGS. 18A-18E illustrate different views of multi-zone a cavity mold complimentary to the core-side mold of FIGS. 17A-17E.

FIGS. 18A-18E illustrate different views of a cavity mold complimentary to the core mold of FIGS. 17A-17-E. Together, the molds of FIGS. 17 and 18 can be used on a press to create a three-compartment tray from molded fiber. The cavity mold 1800 includes a screen 1802, a mold core 1804, a frame 1806, and a four apertures 1808 through the mold 1800 for receiving a heating element. In addition, a molded fiber tray 1820 is illustrated in FIG. 18D on the screen 1802 as it would appear after a pressing operation.

Figures 19A, 19B:
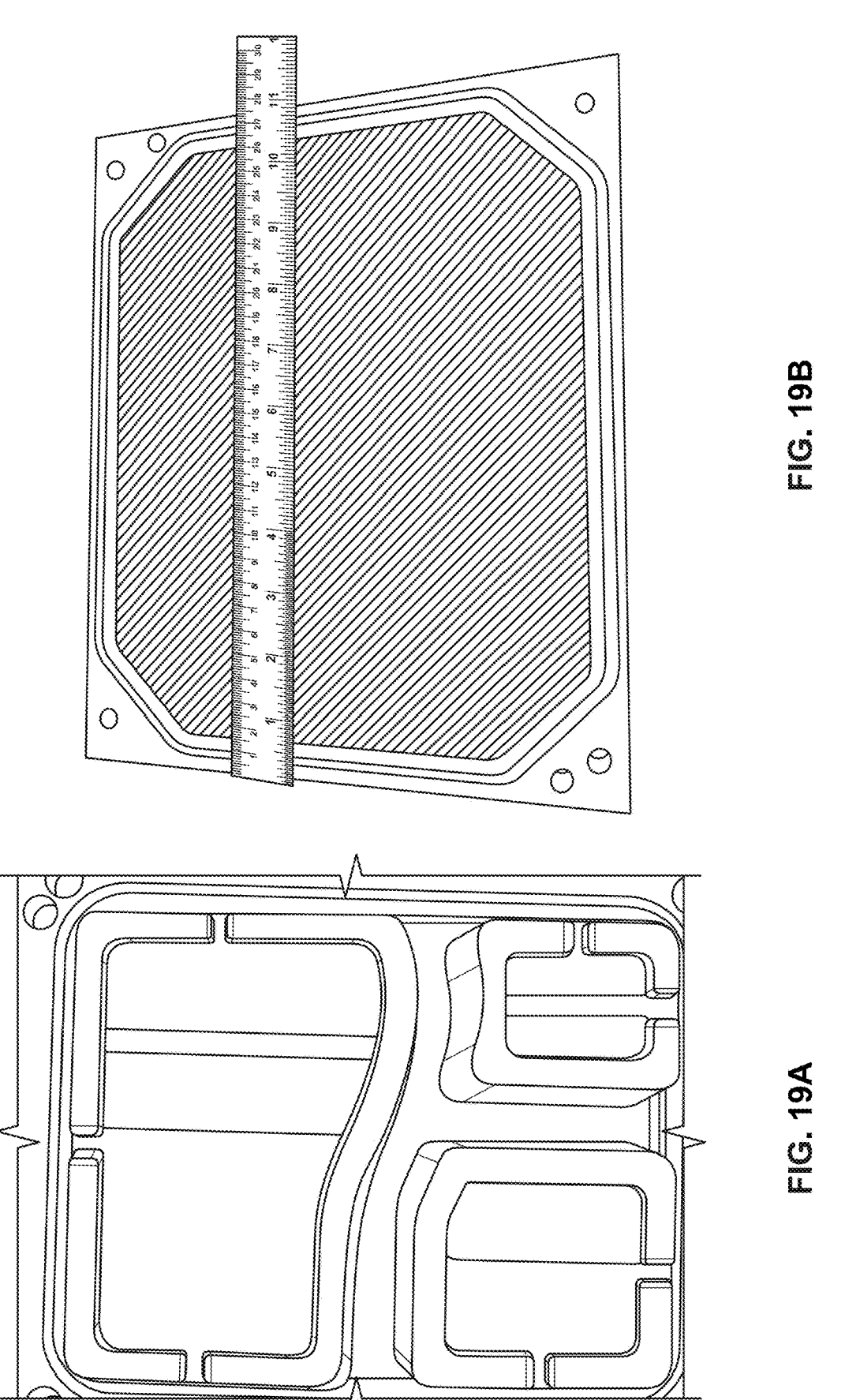
FIGS. 19A and 19B is a picture of a multi-zone mold.

FIGS. 19A and 19B are two pictures of a multi-zone mold that is the 3D printed version of the mold model shown in FIGS. 17A-17-E. A light source is on the opposite side of the mold so that light is shining through the porous mold, highlighting the fill pattern in both the core zone and the tighter fill pattern in the screen. This embodiment of the mold of FIGS. 17A-17-E was created out of Utlem 1010 using a 3D printer with frame properties of wall thickness 2 mm, infill percentage 70%, infill type gyroid, and connecting infill lines (i.e., Connect Infill Lines-Yes). The screen properties were wall thickness 0 mm, infill percentage 70%, infill type gyroid, and not connecting infill lines. The core properties were wall thickness 0 mm, infill percentage 10%, infill type linear, and not connecting infill lines.

Porous Mold Manufacturing Method

Figure 7:
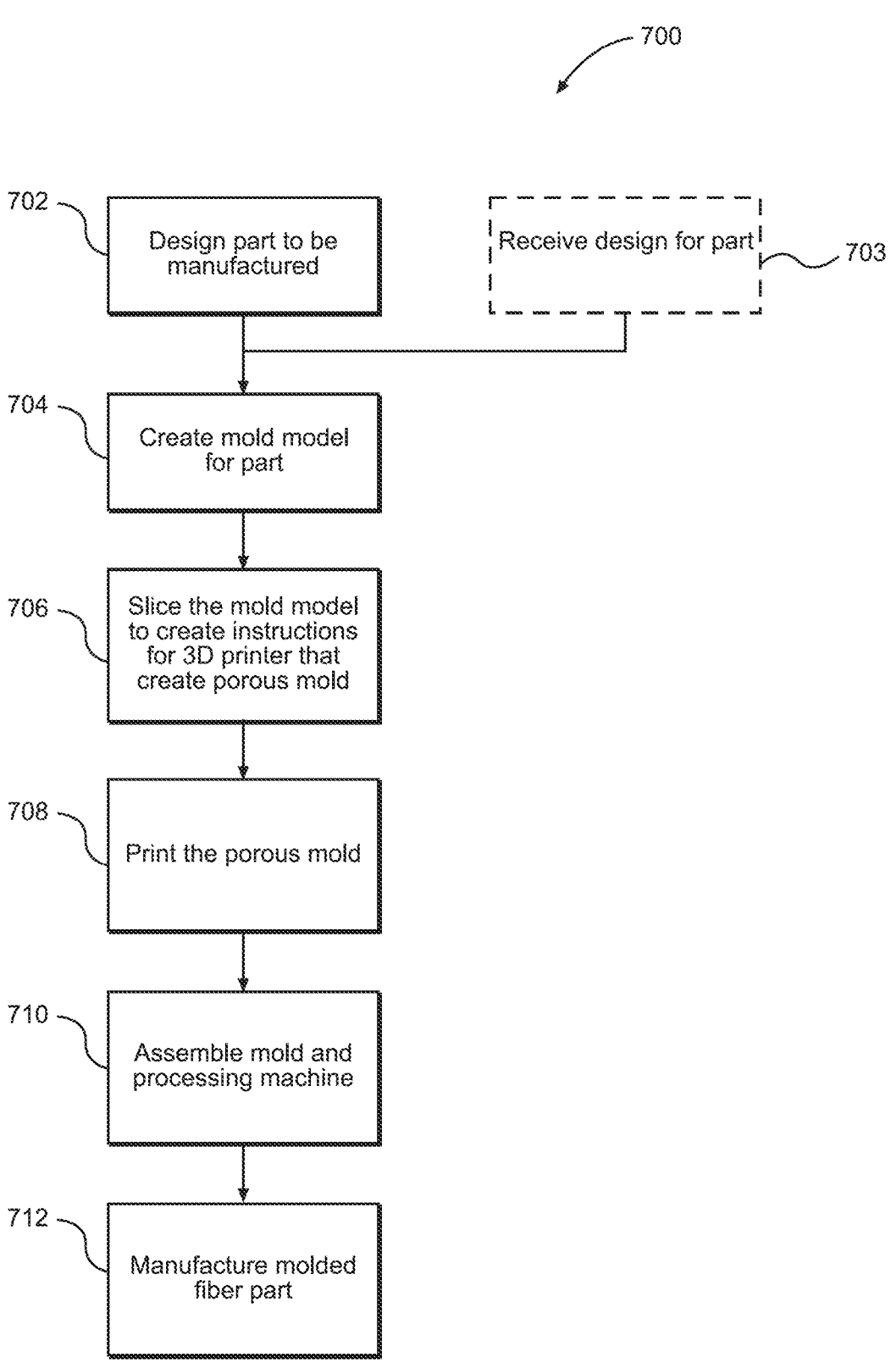
FIG. 7 illustrates an embodiment of a method for creating a porous mold for molded fiber part manufacturing.

FIG. 7 illustrates an embodiment of a method for creating a porous mold for molded fiber part manufacturing. In the embodiment shown the method 700 starts with the design of the part to be manufactured in a part design operation 702. This operation 702 may include modeling the part using the same or different software used in the later development of the mold model. Alternatively, the part design may be provided by and received from a third-party as shown by operation 703.

After the part design is completed, the mold model is created in a mold modeling operation 704. In this operation 704, the mold model having 1) an exterior surface that is the negative shape of at least a portion of the part is developed and 2) an attachment surface or surfaces for attaching the mold to a process machine such as a former or press. In an embodiment the attachment surfaces of the mold model may further include opening, areas, or other features that control the flow of fluid (e.g., air or water) through the mold, such as by allowing the mold to communicate with a pressurization system connected to the process machine. Likewise, electrical or thermal connections could also be designed into the mold model to control the flow of heat or electricity through the mold.

The mold model is then sliced using a slicer in a slicing operation 706 to generate a slicer file that can be interpreted by a 3D printer or other additive manufacturing device to generate a physical print of the modeled mold. As described above, the print parameters used are selected to achieve a desired porosity in the mold.

The slicer file is then provided to a suitable 3D printer or other additive manufacturing device which then prints the porous mold in a printing operation 708.

The mold is then assembled with a molded fiber processing machine, such as former, hot press, trimmer, transfer robot, labeler, or palletizer, in a machine assembly operation 710, noting that some processing machines require two complimentary molds, one for the inner concave surface of the fiber part (sometimes called the core mold) and one for the convex surface of the fiber part (sometimes called the cavity mold).

The assembled molded fiber processing machine is then used in a manufacturing operation 712 in the processing, e.g., forming, pressing, transferring, etc., of the molded fiber part designed in the part design operation 702.

The porous mold may be moved to different processing machines during the manufacturing of multiple copies of molded fiber parts. When the mold wears out, it may be recycled and the material reused to create another porous mold.

Integrated Manufacturing Method

Figure 9:
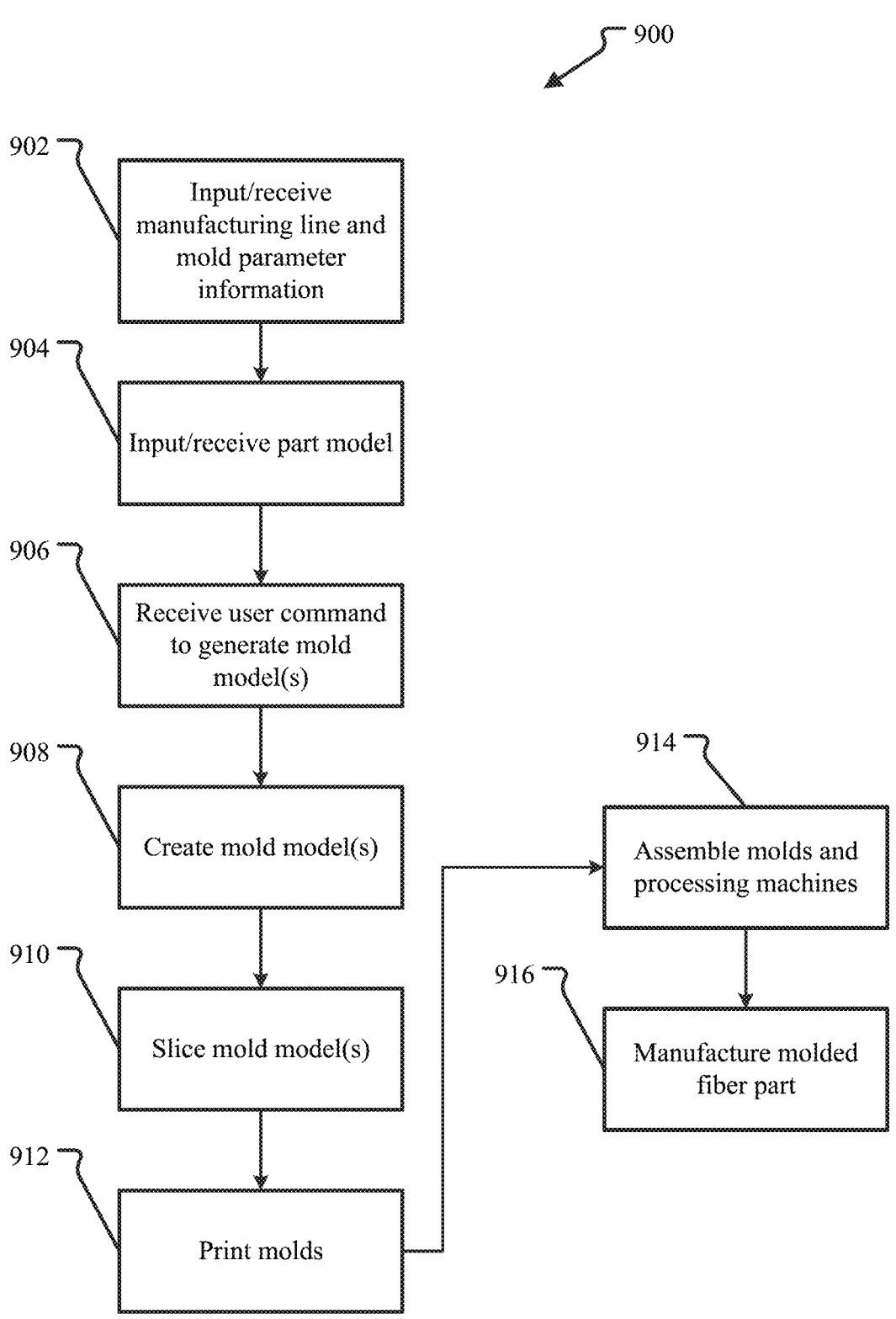
FIG. 9 illustrates an embodiment of an integrated manufacturing method for generating a set of molds for a molded fiber part manufacturing line or manufacturing cell.

FIG. 9 illustrates an embodiment of an integrated manufacturing method for generating a set of molds for a molded fiber part manufacturing line or manufacturing cell. In the embodiment, a manufacturing line includes some number of components, such as formers and subsequent processing machines as described above, each with a known number and type of mold.

For example, in an embodiment a manufacturing line includes i) a former with two forming surfaces each surface with four forming molds (so a total of eight forming molds); ii) six hot presses each with four processing molds matching the forming mold and four processing molds that define the shape of opposite side of the part (a total of four pairs of molds or eight molds per press, i.e., 48 press molds) and iii) finally, each hot press is provided with a transfer robot in the form of a transfer gantry that picks up four parts from the former at a time, places them on the hot press, after pressing removes them from the hot press, and transfers the finished parts to a palletizer for packaging (thus a total of 24 transfer molds).

Thus, in this embodiment, to retrofit the manufacturing line to make a new part, some 80 molds of four different types need to be manufactured. However, the shapes of the molds are dictated by the shape of the part to be made and the properties of the molds (e.g., porosity) are known. Therefore, given the model of the part to be made, the models of the molds can be generated. The method 900 uses this relationship between the model of the part and the molds needed for the manufacturing line to generate the set of molds from the model of the part.

The method starts with a manufacturing line and mold parameter receiving operation 902 in which the operator inputs the number and type of molds used in the manufacturing line (e.g., in this embodiment 80 molds comprising 8 forming molds, 24 hot press molds matching the forming molds, 24 hot press molds for the opposite side of the part, and 24 transfer molds) into a mold model generation computer program.

The operator also inputs the basic physical shape and internal design for each type of mold necessary for each mold type to be connected physically, pneumatically, and otherwise (e.g., electrically or for heat transfer fluid connection as necessary depending on the heating technology used by the hot presses). In an embodiment, the basic shape for each type of mold, referred to as the "mold core," may be the same allowing, for example, the forming molds and the hot press molds matching the forming molds to be identical and interchangeable between machines. (Such interchangeability may be useful in that molds used in the former may become too fouled for forming but may still be suitable for use as press molds, transfer molds, or another process mold, thus extending the usable life of forming molds.) In an alternative embodiment, each mold type may have a different core with its own basic shape and internal structure tailored to its particular machine and use.

The operator further dictates the parameters of the mold to obtain a mold with a specific porosity. In an embodiment, this may be done by selecting the specific parameters for the additive manufacturing of the molds including layer height, fill density and fill pattern. In an embodiment, the operator may be able to input different parameters for different portions of the mold. For example, the user may enter one set of parameters for the mold core and a different set of the parameters for the part contact surface of the mold, which will be generated later when the part shape is selected.

The result of the manufacturing line and mold parameter receiving operation 902 is information sufficient to generate a set of one or more mold core models. These mold core models may be unfinished models in that the shape of the surface upon which the part is formed is not included. In an embodiment, upon receipt of the part model, the fiber contact surface of the mold may be added so that a unitary mold can be printed from the model. Alternatively mold cores modeled in this operation may also be one component of a multi-part mold as discussed with reference to FIG. 8.

Next, the model of the desired part is obtained and input into the mold model generation computer program in a part model input operation 904. In an embodiment the model is a CAD/CAM model for the final molded fiber part. In an embodiment, the part model may be selected or otherwise identified by the user.

Next the user inputs a command to the mold model generation computer program to generate the mold models for the manufacturing line for that part model in a commend operation 906.

In response, the mold model generation computer program then creates a model for each mold type needed in a mold model(s) creation operation 908. Each mold type model includes the appropriate model core and the part contact surface that is the negative shape of one or the other side of the part in the model input into the program as appropriate. The mold type model further defines the fill density and the fill pattern necessary to achieve the desired porosity in each section of the mold, both in the mold core and the part contact surface.

The mold models are then sliced as described above in a slicing operation 910 and the appropriate number of molds of each type are then printed in a printing operation 912. The porous mold are then assembled with the appropriate processing machines in an assembly operation 914 and the molded fiber part matching the design input in operation 904 is manufactured in a manufacturing operation 916.

In an embodiment, the method 900 is, at least in part, performed by a software product executed on a general purpose computing device, such as a personal computer or an iPhone to generate the slicer file(s) from the input part model and the user selected print parameters. For example, in an embodiment operations 902 through 910 may be performed by the same software product on a single computing device. If that device is attached to an additive manufacturing device, then it can also control the printing operation 912. Thus, in this embodiment, the software operator is provided the ability to quickly and easily retrofit an entire molded fiber a manufacturing line while needing only a computing device, an additive manufacturing device, and a model of the new molded fiber part for the manufacturing line to produce.

Various aspects of the subject-matter described herein may be set out non-exhaustively in the following numbered clauses:

1. A porous mold for forming a molded fiber product, said porous mold comprising:

a porous body having a screen interface surface and a machine attachment surface, the machine attachment surface shaped to engage a molded fiber manufacturing device and allow fluid flow between the screen interface surface and the machine attachment surface; and a fiber contact screen covering the screen interface surface of the porous body, the fiber contact screen forming the fiber contact surface of the porous mold; the fiber contact screen made of a set of layers of material bonded together in a screen fill pattern that facilitates fluid flow from the fiber contact surface through the fiber contact screen into the porous body and through the machine attachment surface, the fiber contact screen having a plane of symmetry dividing the fiber contact screen into a first section having a first infill pattern, and a second section having a second infill pattern, the first infill pattern being a reflection of the second infill pattern.

2. The porous mold for forming a molded fiber product of clause 1, wherein the molded fiber manufacturing device is a former or a press.

3. The porous mold for forming a molded fiber product of clauses 1 or 2, wherein the porous body is made of a set of layers of material bonded together in a porous body fill pattern that facilitates fluid flow between the screen interface surface and the machine attachment surface.

4. The porous mold for forming a molded fiber product of clause 3, wherein the porous body has a plane of symmetry dividing the porous body into a third section having a third infill pattern, and a fourth section having a fourth infill pattern, the third infill pattern being a reflection of the fourth infill pattern.

5. The porous mold for forming a molded fiber product of clauses 1-4, wherein the fiber contact screen is created by an additive manufacturing device and attached to the porous body to form the porous mold.

6. The porous mold for forming a molded fiber product of clauses 1-5, wherein the fiber contact screen and the porous body are created by an additive manufacturing device in a single manufacturing operation to form the porous mold.

7. The porous mold for forming a molded fiber product of clauses 1-6, wherein the fiber contact screen has a plurality of planes of symmetry, each plane of symmetry dividing the fiber contact screen into sections with infill patterns that are reflections of the infill patterns of the other sections.

8. The porous mold for forming a molded fiber product of clauses 1-7, wherein the fiber contact screen has a plurality of pores in the fiber contact surface created by the fill pattern being exposed.

9. The porous mold for forming a molded fiber product of clauses 1-8, wherein the fiber contact screen is created by an additive manufacturing device executing instructions to create the fiber contact screen with a fill pattern but no surface layer.

10. A method of making a porous mold using an additive manufacturing device, the method comprising:

designing a part to be created from molded fiber;

creating a mold model of a porous mold for forming at least a portion of the part out of molded fiber, the mold model including:

an exterior surface that is a negative shape of the portion of the part; and an attachment surface for attaching the mold model to a molded fiber manufacturing device;

generating a slicer file based on the mold model that can be interpreted by the additive manufacturing device to physically create the porous mold;

executing the slicer file with the additive manufacturing device thereby printing the porous mold, the porous mold having a porous body having a screen interface surface and a machine attachment surface, the machine attachment surface shaped to engage the molded fiber manufacturing device and allow fluid flow between the screen interface surface and the machine attachment surface; and a fiber contact screen covering the screen interface surface of the porous body, the fiber contact screen forming the fiber contact surface of the porous mold; the fiber contact screen made of a set of layers of material bonded together in a screen fill pattern that facilitates fluid flow from the fiber contact surface through the fiber contact screen into the porous body and through the machine attachment surface, the fiber contact screen having a plane of symmetry dividing the fiber contact screen into a first section having a first infill pattern, and a second section having a second infill pattern, the first infill pattern being a reflection of the second infill pattern;

assembling the porous mold onto the molded fiber manufacturing device; and manufacturing the part from molded fiber using the molded fiber manufacturing device.

11. A porous mold, the porous mold comprising:

a porous core that allows fluid flow through the porous core; and a fiber contact screen made of a set of layers of material bonded together in a fill pattern, the fiber contact screen having a first section with a first fiber contact surface that is a first plane and second section with a second fiber contact surface that is a second plane, the first plane and the second plane are non-parallel;

wherein the fill pattern of the first section of the fiber contact screen is different than the fill pattern of the second section of the fiber contact screen.

12. The porous mold of clause 11, wherein the fill pattern of the first section of the fiber contact screen differs from the fill pattern of the second section of the fiber contact screen based on an angle between the first plane and the second plane.

13. The porous mold of clause 11, wherein the fill pattern of the first section of the fiber contact screen has a first infill density and the fill pattern of the second section of the fiber contact screen has a second infill density, the second infill density different from the first infill density.

14. The porous mold of clause 12, wherein the angle between the first plane and the second plane is from 15 to 90 degrees.

15. The porous mold of clause 12, wherein the angle between the first plane and the second plane is from 45 to 90 degrees.

16. The porous mold of clause 12, wherein the angle between the first plane and the second plane is from 60 to 90 degrees.

17. The porous mold of clause 12, wherein the angle between the first plane and the second plane is from 75 to 90 degrees.

18. The porous mold of clause 12, wherein the fiber contact screen is created by an additive manufacturing device executing instructions for creating the set of layers of material bonded together in the fill pattern, the instructions based on one or more print parameters including an exterior surface thickness print parameter and wherein the exterior surface thickness print parameter for the first section and the second section are zero thickness.

19. A method of making a porous mold using an additive manufacturing device, the method comprising:

designing a part to be created from molded fiber;

creating a mold model of a porous mold for forming at least a portion of the part out of molded fiber, the mold model including:

an exterior surface that is a negative shape of the portion of the part; and an attachment surface for attaching the mold model to a molded fiber manufacturing device;

generating a slicer file based on the mold model that can be interpreted by the additive manufacturing device to physically create the porous mold;

executing the slicer file with the additive manufacturing device thereby printing the porous mold, the porous mold having:

a porous core that allows fluid flow through the porous core; and a fiber contact screen made of a set of layers of material bonded together in a fill pattern, the fiber contact screen having a first section with a first fiber contact surface that is a first plane and second section with a second fiber contact surface that is a second plane, the first plane and the second plane are non-parallel;

wherein the fill pattern of the first section of the fiber contact screen is different than the fill pattern of the second section of the fiber contact screen.

20. The method of clause 19 wherein the slicer file includes instructions for the additive manufacturing device, the instructions based on one or more print parameters including an exterior surface thickness print parameter and wherein the exterior surface thickness print parameter for the first section and the second section are zero thickness.

21. A porous mold comprising:

a porous body made of a set of layers of material bonded together in a core fill pattern that facilitates fluid flow through the porous body, the porous body having:

a frame;

a mold core;

wherein the frame is separated from the mold core by a non-porous wall, thereby preventing fluid flow between the frame and the mold core;

wherein the mold core has a first section with a first surface that is a first plane and second section with a second surface that is a second plane, wherein the first plane and the second plane are non-parallel and have an angle between the first plane and the second plane from 15 to 90 degrees;

wherein the core fill pattern of the first section of the mold core differs from the core fill pattern of the second section of the mold core based on the angle between the first plane and the second plane.

22. The porous mold of clause 21, wherein the core fill pattern of the first section of the mold core has a first infill density and the fill pattern of the second section of the mold core has a second infill density, the second infill density different from the first infill density.

23. The porous mold of clause 22, wherein the second infill density is determined based on the first infill density and the angle between the first plane and the second plane.

24. The porous mold of clauses 21-23 further comprising:
a fiber contact screen covering the first surface and the second surface of the mold core.

25. The porous mold of clauses 21-24, wherein the porous mold is created in a continuous 3D printing operation as one unitary body.

26. The porous mold of clause 24, wherein the mold core and the fiber contact screen are created separately and assembled into the porous mold.

27. The porous mold of clause 24 or 26, wherein the fiber contact screen is made of a set of layers of material bonded together in a screen fill pattern, the fiber contact screen having a third section with a first fiber contact surface that is a third plane and fourth section with a second fiber contact surface that is a fourth plane, the third plane and the fourth plane are non-parallel and associated with the first plane and the second plane of the mold core; and wherein the screen fill pattern of the third section of the fiber contact screen is different than the screen fill pattern of the fourth section of the fiber contact screen.

28. The porous mold of clauses 21-27, wherein the core fill pattern of the first section of the mold core differs from the core fill pattern of the second section of the mold core in one or both of pattern or density.

29. The porous mold of clause 21, wherein the mold core is created by an additive manufacturing device executing instructions for creating the set of layers of material bonded together in the mold core fill pattern, the instructions based on one or more print parameters including an exterior surface thickness print parameter and wherein the exterior surface thickness print parameter for the first section and the second section are zero thickness.

30. The porous mold of clause 24, wherein the fiber contact screen is created by an additive manufacturing device executing instructions for creating the set of layers of material bonded together in the screen fill pattern, the instructions based on one or more print parameters including an exterior surface thickness print parameter and wherein the exterior surface thickness print parameter for the first section and the second section are zero thickness.

31. A method of making a porous mold using an additive manufacturing device, the method comprising:
designing a part to be created from molded fiber;
creating a mold model of a porous mold for forming at least a portion of the part out of molded fiber, the mold model including:
an exterior surface that is a negative shape of the portion of the part; and
an attachment surface for attaching the mold model to a molded fiber manufacturing device;

generating a slicer file based on the mold model that can be interpreted by the additive manufacturing device to physically create the porous mold;
executing the slicer file with the additive manufacturing device thereby printing the porous mold, the porous mold having:
a porous body made of a set of layers of material bonded together in a core fill pattern that facilitates fluid flow through the porous body, the porous body having:
a frame;
a mold core;
wherein the frame is separated from the mold core by a non-porous wall, thereby preventing fluid flow between the frame and the mold core;
wherein the mold core has a first section with a first surface that is a first plane and second section with a second surface that is a second plane, wherein the first plane and the second plane are non-parallel and have an angle between the first plane and the second plane from 15 to 90 degrees;
wherein the core fill pattern of the first section of the mold core differs from the core fill pattern of the second section of the mold core based on the angle between the first plane and the second plane;
assembling the porous mold onto the molded fiber manufacturing device; and
manufacturing the part with the molded fiber manufacturing device.

32. A computer-readable medium storing computer-readable instructions wherein, when acted upon by an additive manufacturing device, controlling the additive manufacturing device to create a porous mold component, the porous mold component comprising:
any of the porous molds of clauses 1-9, 11-18, and 21-30.

33. The computer-readable medium of clause 32, wherein the computer-readable instructions are included in a slicer file which can be executed by the additive manufacturing device to create the porous mold component.

34. The computer-readable medium of clause 32, wherein the computer-readable instructions are derived from a set of print parameters selected by the user.

35. The computer-readable medium of clause 34, wherein the porous mold component has a porosity, wherein the porosity is determined by the print parameters selected by the user.

36. The computer-readable medium of clause 34, wherein the print parameters for different sections of the porous mold component are varied based on a relative angle of the fiber contact surface of the different sections.

37. The computer-readable medium of clause 34, wherein the print parameters are chosen to achieve a determined porosity of the porous mold component.

38. The computer-readable medium of clause 34, wherein the print parameters include an infill pattern.

39. The computer-readable medium of clause 34, wherein a software product executed on a general purpose computing device generates a slicer file from the input part model and the user selected print parameters.

40. The computer-readable medium of clause 34, wherein multiple print parameters are altered based on the range of angles of the fiber contact surface.

41. A method of making a porous mold using an additive manufacturing device, the method comprising:
designing a part to be created from molded fiber;
creating a mold model of a porous mold for forming at least a portion of the part out of molded fiber, the mold model including:

an exterior surface that is a negative shape of the portion of the part; and an attachment surface for attaching the mold model to a molded fiber manufacturing device;

generating a slicer file based on the mold model that can be interpreted by the additive manufacturing device to physically create the porous mold; and executing the slicer file with the additive manufacturing device thereby printing the porous mold, wherein the porous mold is any of the porous molds of clauses 1-9, 11-18, and 21-30.

42. The method of clause 41 further comprising:

assembling the porous mold onto the molded fiber manufacturing device; and manufacturing the part with the molded fiber manufacturing device.

43. An additive manufacturing system comprising:

an additive manufacturing device;

a processor controlling the additive manufacturing device; and a computer-readable medium coupled to the processor, the computer-readable medium storing computer-readable instructions that, when executed by the processor, cause the additive manufacturing system to create any one or more of the porous molds of clauses 1-9, 11-18, and 21-30.

44. The additive manufacturing system of clause 43, wherein the additive manufacturing device is a 3D filament printer.

45. The porous mold of clause 12, wherein the second infill density is determined based on the first infill density and the angle between the first plane and the second plane, and the first plane is the print plane.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained.

Notwithstanding that the numerical ranges and parameters setting forth the broad scope of the technology are approximations, the numerical values set forth in the specific examples are reported as precisely as possible. Any numerical value, however, inherently contain certain errors necessarily resulting from the standard deviation found in their respective testing measurements.

It will be clear that the systems and methods described herein are well adapted to attain the ends and advantages mentioned as well as those inherent therein. Those skilled in the art will recognize that the methods and systems within this specification may be implemented in many manners and as such are not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A porous mold, the porous mold comprising:

a porous core that allows fluid flow through the porous core; and a fiber contact screen made of a set of layers of material bonded together in a fill pattern, the fiber contact screen having a first section with a first fiber contact surface that is a first plane and second section with a second fiber contact surface that is a second plane, the first plane and the second plane are non-parallel;

wherein the fill pattern of the first section of the fiber contact screen is different than the fill pattern of the second section of the fiber contact screen, and wherein the porous core comprises a frame separated from a mold core portion by a non-porous wall, thereby preventing fluid flow between the frame and the mold core portion.

2. A porous mold comprising:

a porous body made of a set of layers of material bonded together in a core fill pattern that facilitates fluid flow through the porous body, the porous body having:

a frame;

a mold core;

wherein the frame is separated from the mold core by a non-porous wall, thereby preventing fluid flow between the frame and the mold core;

wherein the mold core has a first section with a first surface that is a first plane and second section with a second surface that is a second plane, wherein the first plane and the second plane are non-parallel and have an angle between the first plane and the second plane from 15 to 90 degrees;

wherein the core fill pattern of the first section of the mold core differs from the core fill pattern of the second section of the mold core based on the angle between the first plane and the second plane.

3. The porous mold of claim 2, wherein the core fill pattern of the first section of the mold core has a first infill density and the fill pattern of the second section of the mold core has a second infill density, the second infill density being different from the first infill density.

4. The porous mold of claim 3, wherein the second infill density is determined based on the first infill density and the angle between the first plane and the second plane.

5. The porous mold of claim 2 further comprising:

a fiber contact screen covering the first surface and the second surface of the mold core.

6. The porous mold of claim 2, wherein the porous mold is created in a continuous 3D printing operation as one unitary body.

7. The porous mold of claim 5, wherein the mold core and the fiber contact screen are created separately and assembled into the porous mold.

8. The porous mold of claim 5, wherein the fiber contact screen is made of a set of layers of material bonded together in a screen fill pattern, the fiber contact screen having a third section with a first fiber contact surface that is a third plane and fourth section with a second fiber contact surface that is a fourth plane, the third plane and the fourth plane are non-parallel and associated with the first plane and the second plane of the mold core; and wherein the screen fill pattern of the third section of the fiber contact screen is different than the screen fill pattern of the fourth section of the fiber contact screen.

9. The porous mold of claim 2, wherein the core fill pattern of the first section of the mold core differs from the core fill pattern of the second section of the mold core in one or both of pattern or density.

10. The porous mold of claim 2, wherein the mold core is created by an additive manufacturing device executing instructions for creating the set of layers of material bonded together in the mold core fill pattern, the instructions based on one or more print parameters including an exterior surface thickness print parameter and wherein the exterior surface thickness print parameter for the first section and the second section are zero thickness.

11. The porous mold of claim 5, wherein the fiber contact screen is created by an additive manufacturing device executing instructions for creating the set of layers of material bonded together in the screen fill pattern, the instructions based on one or more print parameters including an exterior surface thickness print parameter and wherein the exterior surface thickness print parameter for the first section and the second section are zero thickness.

12. A method of making a porous mold using an additive manufacturing device, the method comprising:

designing a part to be created from molded fiber;

creating a mold model of a porous mold for forming at least a portion of the part out of molded fiber, the mold model including:

an exterior surface that is a negative shape of the portion of the part; and an attachment surface for attaching the mold model to a molded fiber manufacturing device;

generating a slicer file based on the mold model that can be interpreted by the additive manufacturing device to physically create the porous mold;

executing the slicer file with the additive manufacturing device thereby printing the porous mold, the porous mold having:

a porous body made of a set of layers of material bonded together in a core fill pattern that facilitates fluid flow through the porous body, the porous body having:

a frame;

a mold core;

wherein the frame is separated from the mold core by a non-porous wall, thereby preventing fluid flow between the frame and the mold core;

wherein the mold core has a first section with a first surface that is a first plane and second section with a second surface that is a second plane, wherein the first plane and the second plane are non-parallel and have an angle between the first plane and the second plane from 15 to 90 degrees;

wherein the core fill pattern of the first section of the mold core differs from the core fill pattern of the second section of the mold core based on the angle between the first plane and the second plane;

assembling the porous mold onto the molded fiber manufacturing device; and manufacturing the part with the molded fiber manufacturing device.

13. A computer-readable medium storing computer-readable instructions wherein, when acted upon by an additive manufacturing device, controlling the additive manufacturing device to create the porous mold of claim 2.

14. The computer-readable medium of claim 13, wherein the computer-readable instructions are included in a slicer file which can be executed by the additive manufacturing device to create the porous mold component.

15. The computer-readable medium of claim 13, wherein the porous mold component has a porosity, wherein the porosity is determined by the print parameters selected by the user.

16. The computer-readable medium of claim 13, wherein the print parameters for different sections of the porous mold component are varied based on a relative angle of the fiber contact surface of the different sections.

17. An additive manufacturing system comprising:

an additive manufacturing device;

a processor controlling the additive manufacturing device; and a computer-readable medium coupled to the processor, the computer-readable medium storing computer-readable instructions that, when executed by the processor, cause the additive manufacturing system to create the porous mold of claim 2.

18. The additive manufacturing system of claim 17, wherein the additive manufacturing device is a 3D filament printer.

19. The porous mold of claim 3, wherein the second infill density is determined based on the first infill density and the angle between the first plane and the second plane.

* * * * *